US012782691B2

(12) United States Patent
Peng et al.

(10) Patent No.: US 12,782,691 B2
(45) Date of Patent: Nov. 3, 2026

(54) CAMERA OPTICAL LENS

(71) Applicant: Changzhou AAC Raytech Optronics Co., Ltd., Changzhou City (CN)

(72) Inventors: Haichao Peng, Changzhou (CN); Shunda Zhou, Changzhou (CN)

(73) Assignee: Changzhou AAC Raytech Optronics Co., Ltd., Changzhou City (CN)

( * ) Notice: Subject to any disclaimer, the term of this patent is extended or adjusted under 35 U.S.C. 154(b) by 221 days.

(21) Appl. No.: 18/731,395

(22) Filed: Jun. 3, 2024

(65) Prior Publication Data

US 2025/0251572 A1 Aug. 7, 2025

(30) Foreign Application Priority Data

Feb. 6, 2024 (CN) ......................... 202410173082.3

(51) Int. Cl.
*G02B 13/00* (2006.01)
*G02B 9/62* (2006.01)

(52) U.S. Cl.
CPC ........... *G02B 13/0045* (2013.01); *G02B 9/62* (2013.01); *G02B 13/0065* (2013.01)

(58) Field of Classification Search
CPC ... G02B 13/0045; G02B 9/62; G02B 13/0065
USPC .......................................................... 359/713
See application file for complete search history.

(56) References Cited

U.S. PATENT DOCUMENTS

| | | | | |
|---|---|---|---|---|
| 11,280,983 B2 * | 3/2022 | Ko | ..................... | G02B 13/0045 |
| 11,768,350 B2 * | 9/2023 | Kim | ................... | G02B 13/0065 359/734 |
| 12,111,445 B2 * | 10/2024 | Yoo | ...................... | G02B 13/001 |
| 2019/0056566 A1 * | 2/2019 | Yoo | .................... | G02B 13/0065 |
| 2019/0212529 A1 * | 7/2019 | Ko | ........................... | G02B 5/04 |

* cited by examiner

*Primary Examiner* — Sharrief I Broome
(74) *Attorney, Agent, or Firm* — Wiersch Law Group

(57) ABSTRACT

A camera optical lens includes a first lens having a negative refractive power, a second lens having a negative refractive power, a third lens having a positive refractive power, a fourth lens having a positive refractive power, a fifth lens having a negative refractive power, and a sixth lens having a positive refractive power that are in order from an object side to an image side. The fourth lens is embodied as a prism, the camera optical lens satisfies relationships: $-4.00 \le f2/f3 \le -1.20$ and $95.00 \le (FOV \times f)/IH \le 101.632$, where f2 represents a focal length of the second lens, f3 represents a focal length of the third lens, FOV represents a field of view of the camera optical lens, f represents a focal length of the camera optical lens, IH represents an image height of 1.0H of the camera optical lens.

10 Claims, 12 Drawing Sheets

CAMERA OPTICAL LENS

CROSS REFERENCE TO RELATED APPLICATIONS

The present application claims the benefit of priority under the Paris Convention to Chinese Patent Application No. 202410173082.3 filed on Feb. 6, 2024, which is incorporated herein by reference in its entirety.

TECHNICAL FIELD

The various embodiments described in this document relate in general to the field of optical lenses, in particular to a camera optical lens suitable for portable terminal devices such as smart phones and digital cameras, and camera devices such as monitors and PC lenses.

BACKGROUND

In recent years, with the emergence of various smart devices, the demand for miniaturized camera optical lenses is increasing day by day, and due to the reduction in the pixel size of photosensitive devices, and current electronic products developing towards good functions and thin, light and portable appearance, miniature camera optical lenses with good imaging quality have become the mainstream in the current market. In order to obtain good imaging quality, multi-piece lens structure is generally adopted. Moreover, with the development of technology and the increase of diverse needs of users, the pixel area of photosensitive devices is shrinking steadily, and the requirement of the system for the imaging quality is improving constantly, six-piece lens structures gradually appear in lens design. There is an urgent need for wide-angle camera lenses which have good optical characteristics, small size, and the chromatic aberration of which is fully corrected.

SUMMARY

In view of the above, the disclosure aims to provide a camera optical lens, which has good optical characteristics and satisfies the design requirements of large aperture, ultra-thin, and wide angle.

In some embodiments, embodiments of the disclosure provide a camera optical lens. The camera optical lens includes six lenses including a first lens having a negative refractive power, a second lens having a negative refractive power, a third lens having a positive refractive power, a fourth lens having a positive refractive power, a fifth lens having a negative refractive power, and a sixth lens having a positive refractive power that are arranged in order from an object side to an image side of the camera optical lens. The fourth lens is embodied as a prism, where the camera optical lens satisfies following relationships: $-4.00 \leq f2/f3 \leq -1.20$; and $95.00 \leq (FOV \times f)/IH \leq 101.632$, where f2 represents a focal length of the second lens, f3 represents a focal length of the third lens, FOV represents a field of view of the camera optical lens, f represents a focal length of the camera optical lens, and IH represents an image height of 1.0H of the camera optical lens.

In some embodiments, the first lens has a focal length of f1 and the camera optical lens further satisfies a following relationship: $-2.50 \leq f1/f \leq -1.50$.

In some embodiments, the camera optical lens further satisfies a following relationship: $v3-v2 \geq 30.00$, where v2 represents the abbe number of the second lens, and v3 represents the abbe number of the third lens.

In some embodiments, the camera optical lens further satisfies a following relationship: $2.00 \leq R9/R10 \leq 5.00$, where R9 represents a central curvature radius of an object-side surface of the fifth lens, and R10 represents a central curvature radius of an image-side surface of the fifth lens.

In some embodiments, the camera optical lens further satisfies a following relationship: $20.00 \leq f6/d11 \leq 60.00$, where f6 represents a focal length of the sixth lens, and d11 represents an on-axis thickness of the sixth lens.

In some embodiments, the camera optical lens further satisfies a following relationship: $SD11/IH \leq 0.31$, where SD11 represents a half-aperture of an object-side surface of the first lens.

In some embodiments, the first lens has a concave image-side surface in a paraxial region, and the camera optical lens further satisfies following relationships: $0.49 \leq (R1+R2)/(R1-R2) \leq 1.59$, and $0.01 \leq d1/TTL \leq 0.05$, where R1 represents a central curvature radius of an object-side surface of the first lens, R2 represents a central curvature radius of the image-side surface of the first lens, d1 represents an on-axis thickness of the first lens, and TTL represents a total track length of the camera optical lens.

In some embodiments, the second lens has a convex object-side surface in a paraxial region and has a concave image-side surface in the paraxial region, where the camera optical lens further satisfies following relationships: $-7.55 \leq f2/f \leq -0.87$, $1.30 \leq (R3+R4)/(R3-R4) \leq 6.59$, and $0.06 \leq d3/TTL \leq 0.24$, where R3 represents a central curvature radius of the object-side surface of the second lens, R4 represents a central curvature radius of the image-side surface of the second lens, d3 represents an on-axis thickness of the second lens, and TTL represents a total track length of the camera optical lens.

In some embodiments, the third lens has a convex object-side surface in a paraxial region, and has a concave image-side surface in the paraxial region, where the camera optical lens further satisfies following relationships: $0.48 \leq f3/f \leq 1.63$, $-3.38 \leq (R5+R6)/(R5-R6) \leq -0.93$, and $0.04 \leq d5/TTL \leq 0.14$, where R5 represents a central curvature radius of the object-side surface of the third lens, R6 represents a central curvature radius of the image-side surface of the third lens, d5 represents an on-axis thickness of the third lens, and TTL represents a total track length of the camera optical lens.

In some embodiments, the fourth lens has a convex object-side surface in a paraxial region, and has a convex image-side surface in the paraxial region, where the camera optical lens further satisfies following relationships: $0.38 \leq f4/f \leq 1.38$, $0.50 \leq (R7+R8)/(R7-R8) \leq 1.50$, and $0.18 \leq d7/TTL \leq 0.61$, where f4 represents a focal length of the fourth lens, R7 represents a central curvature radius of the object-side surface of the fourth lens, R8 represents a central curvature radius of the image-side surface of the fourth lens, d7 represents an on-axis thickness of the fourth lens, and TTL represents a total track length of the camera optical lens.

BRIEF DESCRIPTION OF THE DRAWINGS

In order to explain more clearly the technical proposal in the embodiment of the present disclosure, the drawings required to be used in the description of the embodiment will be briefly described below. Obviously, the drawings in the description below are only some embodiments of the present disclosure. For those of ordinary skill in the art, other drawings can be obtained from these drawings without creative effort.

DETAILED DESCRIPTION OF THE EMBODIMENT

Figure 1:
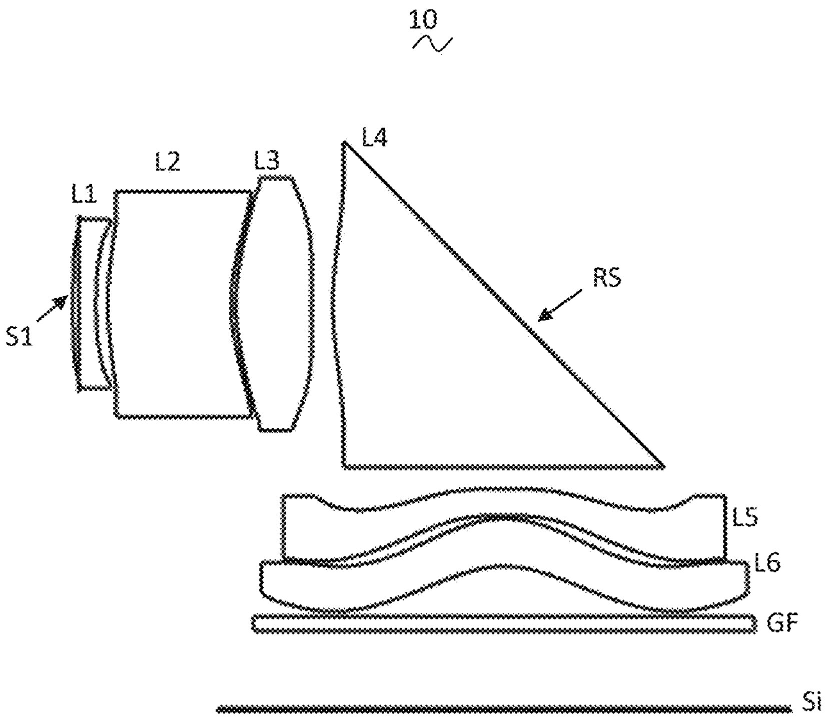
FIG. 1 is a schematic structural diagram of a camera optical lens according to a first embodiment of the present disclosure.

In order to make the object, technical proposal, and advantages of the present disclosure clearer, the embodiments of the present disclosure will be described in detail in conjunction with the accompanying drawings below. However, it will be appreciated by those of ordinary skill in the art that in various embodiments of the present disclosure, a number of technical details are proposed to enable the reader to better understand the present disclosure. However, even without these technical details and variations and modifications based on the following embodiments, the technical scheme required to be protected by the present disclosure can be achieved.

Referring to FIGS. 1 to 20, the technical embodiment of the present disclosure provides a camera optical lens 10, 20, 30, 40, and 50. FIGS. 1, 5, 9, 13, and 17 illustrate the camera optical lens 10, 20, 30, 40, and 50 of the present disclosure, each of which includes six lenses. Specifically, the camera optical lens includes an aperture S1, a first lens L1, a second lens L2, a third lens L3, a fourth lens L4, a fifth lens L5, and a sixth lens L6 that are arranged in sequence from an object side to an image side. An optical element such as an optical filter GF may be provided between the sixth lens L6 and an image plane Si.

The first lens L1 is made of a plastic material, the second lens L2 is made of a plastic material, the third lens L3 is made of a plastic material, the fourth lens L4 is made of a plastic material, the fifth lens L5 is made of a plastic material, and the sixth lens L6 is made of a plastic material. Each lens of the six lenses may also be of other materials.

The fourth lens LA is an aspherical prism including a reflective surface RS. Light emitted from the image side of the third lens L3 is reflected and turned through the reflective surface RS of the fourth lens L4, and then emitted from the image side of the fourth lens L4. By the design of the folded optical path, the thickness of the device can be reduced.

The focal length of the second lens L2 is defined as f2, and the focal length of the third lens L3 is defined as f3, where f2 and f3 satisfy the following relational formula: $-4.00 \leq f2/f3 \leq -1.20$. When a ratio of the focal length of the second lens L2 to the focal length of the third lens L3 is within the above range of the conditional formula, the focal lengths of the two lenses can be set to have same/similar values, which is conducive to the smooth transition of light and the improvement of image quality.

The field of view of the camera optical lens is defined as FOV, the focal length of the camera optical lens is defined as f, and an image height of 1.0H is defined as IH, where the camera optical lens satisfies the following relationship formulas $95.00 \leq (FOV \times f)/IH \leq 101.632$. When the condition is satisfied, balance between a large field of view and a telephoto can be achieved, thereby ensuring medium and long-distance imaging.

The focal length of the first lens L1 is defined as f1, and the camera optical lens satisfies the following relationship: $-2.50 \leq f1/f \leq -1.50$. When a ratio of the focal length of the first lens L1 to the total focal length of the system is within the range of the conditional formula, the amount of incoming light can be ensured.

The abbe number of the second lens L2 is defined as v2, and the abbe number of the third lens L3 is defined as v3, where v2 and v3 satisfy the following relationship formula: $v3 - v2 \geq 30.00$, which specifies a difference between chromatic dispersion indexes of materials of the adjacent second and third lens. When the difference between the chromatic dispersion indexes of the second and third lens is within the range of the conditional formula, the system chromatic aberration can be effectively balanced, thus enabling the chromatic aberration to satisfy $|LC| \leq 3.5$ μm.

A central curvature radius of an object-side surface of the fifth lens L5 is defined as R9, and a central curvature radius of an image-side surface of the fifth lens L5 is defined as R10, where R9 and R10 satisfy the following relationship formula: $2.00 \leq R9/R10 \leq 5.00$, which specifies a shape of the fifth lens L5. When a ratio of R9 to R10 is within the range of the conditional formula, it is conducive to correcting the astigmatism and distortion of the camera lens, to enable the distortion to satisfy $|\text{Distortion}| \leq 2.2\%$, such that the generation of dark corners can be reduced.

The focal length of the sixth lens L6 is defined as f6, and the on-axis thickness of the sixth lens L6 is defined as d11, where f6 and d11 satisfy the following relationship: $20.00 \leq f6/d11 \leq 60.00$, which specifies a ratio of the focal length of the sixth lens L6 to the on-axis thickness of the sixth lens L6. When the ratio of the refractive power of the sixth lens L6 to the on-axis thickness of the sixth lens L6 is within the range of the conditional formula, the sixth lens can maintain a positive refractive power of sufficient strength to correct the off-axis aberration of the image side end, and can effectively shorten the total track length to achieve miniaturization, thereby expanding the application range of the product.

The half-aperture of the object-side surface of the first lens L1 is defined as SD11, satisfying the following relational formula: $SD11/IH \leq 0.31$, which stipulates a ratio of the head size to the image height of the camera optical lens. When the ratio of the head size to the image height of the camera optical lens is within the range of the conditional formula, a small head can be realized.

When the above conditions are satisfied, each of the camera optical lenses 10, 20, 30, 40, and 50 has good optical performance and can meet the wide-angle design requirement. According to the characteristics of the camera optical lenses 10, 20, 30, 40, and 50, the camera optical lenses 10, 20, 30, 40, and 50 are particularly suitable for mobile phone imaging lens assemblies and WEB imaging lenses composed of camera elements such as charge coupled device (CCD) or complementary metal-oxide semiconductor sensor (CMOS sensor) for high pixels.

Based on the above conditional formulas and the functions that can be realized, the characteristics of each lens of the lenses are further refined as follows.

The first lens L1 has a convex or concave object-side surface in the paraxial region and a concave image-side surface in the paraxial region, and the first lens L1 has a negative refractive power. The object-side surface and image-side surface of the first lens L1 may also be provided in other concave and convex distributions.

The central curvature radius of the object-side surface of the first lens L1 is defined as R1, and the central curvature radius of the image-side surface of the first lens L1 is defined as R2, where R1 and R2 satisfy the following relationship: $0.49 \leq (R1+R2)/(R1-R2) \leq 1.59$. With this configuration, the shape of the first lens L1 can be reasonably controlled, so that the first lens L1 can effectively correct the spherical aberration of the system. Preferably, R1 and R2 satisfy the following relationship: $0.78 \leq (R1+R2)/(R1-R2) \leq 1.27$.

The on-axis thickness of the first lens L1 is defined as d1, and the total track length of each of the camera optical lenses 10, 20, 30, 40, and 50 is defined as TTL, where d1 and TTL satisfy the following relational expression: $0.01 \leq d1/TTL \leq 0.05$. When a ratio of d1 to TTL is within the range of the conditional expression, it is beneficial to realize miniaturization. Preferably, d1 and TTL satisfy the following relationship: $0.02 \leq d1/TTL \leq 0.04$.

The second lens L2 has a convex object-side surface in the paraxial region and a concave image-side surface in the paraxial region, and the second lens L2 has a negative refractive power. The object-side surface and image-side surface of the second lens L2 may also be provided in other concave and convex distributions.

The focal length of the camera optical lens is defined as f, and the focal length of the second lens L2 is defined as f2, where f and f2 satisfy the following relationship: −7.55 23 f2/f≤−0.87. By controlling a ratio of f2 to f to be within a reasonable range, it is beneficial to correct the aberration of the optical system. Preferably, f and f2 satisfy the following relationship: $-4.72 \leq f2/f \leq -1.08$.

The central curvature radius of the object-side surface of the second lens L2 is defined as R3, and the central curvature radius of the image-side surface of the second lens L2 is defined as R4, where R3 and R4 satisfy the following relationship formula: $1.30 \leq (R3+R4)/(R3-R4) \leq 6.59$, which specifies the shape of the second lens L2. With this configuration, with the development of ultra-thin wide-angle, it is beneficial for correcting chromatic aberration on-axis. Preferably, R3 and R4 satisfy the following relationship formula: $2.08 \leq (R3+R4)/(R3-R4) \leq 5.27$.

The on-axis thickness of the second lens L2 is defined as d3, and the total track length of each of the camera optical lenses 10, 20, 30, 40, and 50 is defined as TTL, where d3 and TTL satisfy the following relationship formula: $0.06 \leq d3/TTL \leq 0.24$, which is conducive to realizing miniaturization when a ratio of d3 to TTL is within the range of the conditional formula. Preferably, d3 and TTL satisfy the following relationship formula: $0.10 \leq d3/TTL \leq 0.20$.

The third lens L3 has a convex object-side surface in the paraxial region, and has a concave image-side surface in the paraxial region, and the third lens L3 has a positive refractive power. The object-side surface and the image-side surface of the third lens L3 may also be provided in other concave and convex distributions.

The focal length of the camera optical lens is defined as f, and the focal length of the third lens L3 is defined as f3, where f3 and f satisfy the following relationship: $0.48 \leq f3/f \leq 1.63$. Through the reasonable distribution of the optical focal power, the system has good imaging quality and lower sensitivity. Preferably, f and f3 satisfy the following relationship formula: $0.76 \leq f3/f \leq 1.30$.

The central curvature radius of the object-side surface of the third lens L3 is defined as R5, and the central curvature radius of the image-side surface of the third lens L3 is defined as R6, satisfying the following relationship formula: $-3.38 \leq (R5+R6)/(R5-R6) \leq -0.93$. Within the range of the conditional formula, the shape of the third lens L3 can be effectively controlled, which is beneficial to the shaping of the third lens L3, and avoids poor shaping and stress generation due to excessive surface curvature of the third lens L3. Preferably, R5 and R6 satisfy the following relationship formula: $-2.11 \leq (R5+R6)/(R5-R6) \leq -1.17$.

The on-axis thickness of the third lens L3 is defined as d5, and the total track length of each of the camera optical lenses 10, 20, 30, 40, and 50 is defined as TTL, which satisfies the following relationship formula: $0.04 \leq d5/TTL \leq 0.14$. With this configuration, it is conducive to realizing miniaturization. Preferably, d5 and TTL satisfy the following relationship formula: $0.06 \leq d5/TTL \leq 0.11$.

The fourth lens L4 has a convex object-side surface in the paraxial region and a convex image-side surface in the paraxial region, and the fourth lens L4 has a positive refractive power. The object-side surface and image-side surface of the fourth lens L4 may also be provided in other concave and convex distributions.

The focal length of the camera optical lens is defined as f, and the focal length of the fourth lens LA is defined as f4, which satisfy the following relationship: $0.38 \leq f4/f \leq 1.38$. Through the reasonable distribution of the optical focal power, the system has good imaging quality and lower sensitivity. Preferably, f and f4 satisfy the relationship: 0.61≤f4/f≤1.11.

The central curvature radius of the object-side surface of the fourth lens LA is defined as R7, and the central curvature radius of the image-side surface of the fourth lens L4 is defined as R8, which satisfy the following relationship formula: 0.50≤(R7+R8)/(R7−R8)≤1.50, specifying the shape of the fourth lens L4. When R7 and R8 satisfy the range of the conditional formula, with the development of ultra-thin wide-angle, it is conducive to correcting problems of off-axis aberration and the like. Preferably, R7 and R8 satisfy the following relationship formula: 0.80≤(R7+R8)/(R7−R8)≤1.20.

The on-axis thickness of the fourth lens L4 is defined as d7, and the total track length of each of the camera optical lenses 10, 20, 30, 40, and 50 is defined as TTL, satisfying the following relationship formula: 0.18≤d7/TTL≤0.61, which is conducive to realizing miniaturization within the range of the conditional formula. Preferably, d7 and TTL satisfy the following relationship formula: 0.28≤d7/TTL≤0.49.

The fifth lens L5 has a convex object-side surface in the paraxial region and a concave image-side surface in the paraxial region, and the fifth lens L5 has a negative refractive power. The object-side surface and image-side surface of the fifth lens L5 may also be provided in other concave and convex distributions.

The focal length of the camera optical lens is defined as f, and the focal length of the fifth lens L5 is defined as f5, satisfying the following relationship: −8.15≤f5/f≤−1.51. By controlling the parameters of the fifth lens L5, the light angle of the camera optical lens can be effectively smoothed, and the tolerance sensitivity of the camera optical lens is reduced. Preferably, f5 and f satisfy the following relationship: −5.09≤f5/f≤−1.89.

The central curvature radius of the object-side surface of the fifth lens L5 is defined as R9, and the central curvature radius of the image-side surface of the fifth lens L5 is defined as R10, where R9 and R10 satisfy the following relationship formula: 0.75≤(R9+R10)/(R9−R10)≤4.48, which specifies the shape of the fifth lens L5. When within the above range, with the development of ultra-thin wide-angle, it is conducive to correcting problems of off-axis aberration and the like. Preferably, R9 and R10 satisfy the following relationship formula: 1.20≤(R9+R10)/(R9−R10) ≤3.58.

The on-axis thickness of the fifth lens L5 is defined as d9, and the total track length of each of the camera optical lenses 10, 20, 30, 40, and 50 is defined as TTL, where d9 and TTL satisfy the following relational expression: 0.01≤d9/TTL≤0.05, which is conducive to realizing miniaturization within the range of the conditional formula. Preferably, d9 and TTL satisfy the relational expression: 0.02≤d9/TTL≤0.04.

The sixth lens L6 has a convex object-side surface in the paraxial region and a concave image-side surface in the paraxial region, and the sixth lens L6 has a positive refractive power. The object-side surface and image-side surface of the sixth lens L6 may also be provided in other concave and convex distributions.

The focal length of the camera optical lens is defined as f, and the focal length of the sixth lens L6 is defined as f6, satisfying the following relational formula: 1.26≤f6/f≤11.21. Through the reasonable distribution of the optical focus power, the system has good imaging quality and lower sensitivity. Preferably, f6 and f satisfy relational formula: 2.02≤f6/f≤8.97.

The central curvature radius of the object-side surface of the sixth lens L6 is defined as R11, and the central curvature radius of the image-side surface of the sixth lens L6 is defined as R12, where R11 and R12 satisfy the following relationship formula: −294.00≤(R11+R12)/(R11−R12) ≤655.50, which specify the shape of the sixth lens L6. When within the above range, with the development of ultra-thin wide-angle, it is conducive to correcting problems of off-axis aberration and the like. Preferably, R11 and R12 satisfy the following relationship formula: −183.75≤(R11+R12)/(R11−R12)≤524.40.

The on-axis thickness of the sixth lens L6 is defined as d11, and the total track length of each of the camera optical lenses 10, 20, 30, 40, and 50 is defined as TTL, satisfying the following relationship formula: 0.03≤d11/TTL≤0.10, which is conducive to realizing miniaturization within the range of the conditional formula. Preferably, d11 and TTL satisfy the relationship formula: 0.04≤d11/TTL≤0.08.

The image height of the camera optical lens is defined as IH, the total track length of the camera optical lens is defined as TTL, which satisfy the following relationship formula: TTL/IH≤3.10, thereby facilitating the realization of ultra-thinning. Preferably, TTL and IH satisfy the following relationship formula: TTL/IH≤3.04.

The field of view FOV of the camera optical lens is greater than or equal to 66.00°, thereby realizing wide-angle.

The aperture value (f number, FNO) of the camera optical lens is less than or equal to 2.50, thereby realizing a large aperture, such that the camera optical lens has good imaging performance.

The camera optical lens of the present disclosure will be explained with specific embodiments illustrated below. The symbols described in each embodiment are shown below. The unit of the focal length, the on-axis distance, the central curvature radius, the on-axis thickness, inflexion point positions, and arrest point positions is mm.

TTL: total track length (an on-axis distance from the object-side surface of the first lens L1 to the image surface Si), and unit of the TTL being in mm.

Aperture value (F number, FNO): a ratio of the effective focal length of the camera optical lens to the diameter of the pupil.

Preferably, inflexion points and/or arrest point may also be provided on the object-side surface and/or the image-side surface of the lens to meet high-quality imaging requirements.

The technical proposal of the present disclosure will be described in detail in five embodiments, and a comparative example will be provided as a reference for illustration. The technical effect of the present disclosure could not be achieved when value of the parameters exceeds beyond the range of the above-mentioned conditional formula.

First Embodiment

Tables 1 and 2 show design data of the camera optical lens 10 according to the first embodiment of the present disclosure.

TABLE 1

| | R | d | | | nd | | vd |
|---|---|---|---|---|---|---|---|
| S1 | ∞ | d0 = | −0.044 | | | | |
| R1 | −322.243 | d1 = | 0.184 | nd1 | 1.5444 | v1 | 55.81 |
| R2 | 3.681 | d2 = | 0.095 | | | | |
| R3 | 2.402 | d3 = | 0.986 | nd2 | 1.6610 | v2 | 20.53 |

TABLE 1-continued

| | R | | d | | nd | | vd |
|---|---|---|---|---|---|---|---|
| R4 | 1.354 | d4 = | 0.039 | | | | |
| R5 | 1.510 | d5 = | 0.604 | nd3 | 1.5444 | v3 | 55.81 |
| R6 | 7.032 | d6 = | 0.173 | | | | |
| R7 | 2.462 | d7 = | 2.652 | nd4 | 1.9000 | v4 | 40.00 |
| R8 | ∞ | d8 = | 0.169 | | | | |
| R9 | 10.399 | d9 = | 0.210 | nd5 | 1.6499 | v5 | 21.26 |
| R10 | 3.797 | d10 = | 0.026 | | | | |
| R11 | 0.898 | d11 = | 0.373 | nd6 | 1.5444 | v6 | 55.81 |
| R12 | 0.864 | d12 = | 0.394 | | | | |
| R13 | ∞ | d13 = | 0.110 | ndg | 1.5200 | vg | 64.20 |
| R14 | ∞ | d14 = | 0.633 | | | | |

The meaning of the various symbols is as follows.

S1: aperture;

R: the curvature radius at the center of the optical surface;

R1: the central curvature radius of the object-side surface of the first lens L1;

R2: the central curvature radius of the image-side surface of the first lens L1;

R3: the central curvature radius of the object-side surface of the second lens L2;

R4: the central curvature radius of the image-side surface of the second lens L2;

R5: the central curvature radius of the object-side surface of the third lens L3;

R6: the central curvature radius of the image-side surface of the third lens L3;

R7: the central curvature radius of the object-side surface of the fourth lens L4;

R8: the central curvature radius of the image-side surface of the fourth lens L4;

R9: the central curvature radius of the object-side surface of the fifth lens L5;

R10: the central curvature radius of the image-side surface of the fifth lens L5;

R11: the central curvature radius of the object-side surface of the sixth lens L6;

R12: the central curvature radius of the image-side surface of the sixth lens L6;

R13: the central curvature radius of the object-side surface of the optical filter GF;

R14: the central curvature radius of the image-side surface of the optical filter GF;

d: the on-axis thickness of the lens and the on-axis distance between the lenses;

d0: the on-axis distance from the aperture S1 to the object-side surface of the first lens L1;

d1: the on-axis thickness of the first lens L1;

d2: the on-axis distance from the image-side surface of the first lens L1 to the object-side surface of the second lens L2;

d3: the on-axis thickness of the second lens L2;

d4: the on-axis distance from the image-side surface of the second lens L2 to the object-side surface of the third lens L3;

d5: the on-axis thickness of the third lens L3;

d6: the on-axis distance from the image-side surface of the third lens L3 to the object-side surface of the fourth lens LA;

d7: the on-axis thickness of the fourth lens LA;

d8: the on-axis distance from the image-side surface of the fourth lens L4 to the object-side surface of the fifth lens L5;

d9: the on-axis thickness of the fifth lens L5;

d10: the on-axis distance from the image-side surface of the fifth lens L5 to the object-side surface of the sixth lens L6;

d11: the on-axis thickness of the sixth lens L6;

d12: the on-axis distance from the image-side surface of the sixth lens L6 to the object-side surface of the optical filter GF;

d13: the on-axis thickness of the optical filter GF;

d14: the on-axis distance from the image-side surface of the optical filter GF to the image surface Si;

nd: the refractive index of a d line (the d line refers to green light with a wavelength of 550 nm);

nd1: the refractive index of the d line of the first lens L1;

nd2: the refractive index of the d line of the second lens L2;

nd3: the refractive index of the d line of the third lens L3;

nd4: the refractive index of the d line of the fourth lens L4;

nd5: the refractive index of the d line of the fifth lens L5;

nd6: the refractive index of the d line of the sixth lens L6;

ndg: the refractive index of the d line of the optical filter GF;

vd: the abbe number;

v1: the abbe number of first lens L1;

v2: the abbe number of second lens L2;

v3: the abbe number of the third lens L3;

v4: the abbe number of the fourth lens LA;

v5: the abbe number of the fifth lens L5;

v6: the abbe number of the sixth lens L6; and vg: the abbe number of the optical filter GF.

Table 2 shows aspherical data of each of the lenses in the camera optical lens 10 according to the first embodiment of the present disclosure.

TABLE 2

| | Conic coefficient | Aspherical coefficient | | | | |
|---|---|---|---|---|---|---|
| | k | A4 | A6 | A8 | A10 | A12 |
| R1 | −9.87778E+02 | 4.25820E−01 | −3.79780E−01 | −5.40620E−01 | 1.04860E+01 | −5.25920E+01 |
| R2 | −3.22225E+01 | 4.91830E−01 | −5.28820E−01 | 1.57340E−02 | 1.76400E+01 | −1.35170E+02 |
| R3 | −1.21463E+01 | −3.13890E−02 | 2.13540E−01 | −5.54130E+00 | 5.28360E+01 | −2.93990E+02 |
| R4 | −6.00409E+00 | −2.26680E−01 | 1.68970E+00 | −9.28380E+00 | 3.28790E+01 | −7.80260E+01 |
| R5 | −1.13926E+01 | −1.57400E−01 | 1.67290E+00 | −9.07550E+00 | 3.09230E+01 | −7.01970E+01 |
| R6 | −4.73778E+02 | −3.53380E−01 | 4.51180E−02 | 1.29260E+00 | −5.74880E+00 | 1.34640E+01 |
| R7 | −2.19292E+01 | −4.53840E−02 | −1.80740E−03 | −3.47580E−02 | 1.20010E−01 | −1.84520E−01 |
| R8 | / | / | / | / | / | / |
| R9 | −2.19468E+02 | 7.27790E−01 | −1.53610E+00 | 1.87590E+00 | −1.67760E+00 | 1.14430E+00 |
| R10 | 3.17363E+00 | 8.96560E−01 | −1.93490E+00 | 2.13550E+00 | −1.49470E+00 | 6.96260E−01 |
| R11 | −1.77582E+00 | −1.25420E−01 | −1.71400E−03 | −1.89040E−01 | 4.01710E−01 | −3.51910E−01 |
| R12 | −5.29860E+00 | 1.62190E−01 | −5.12940E−01 | 6.23230E−01 | −4.54990E−01 | 2.12750E−01 |

TABLE 2-continued

| | Conic coefficient | Aspherical coefficient | | | |
|---|---|---|---|---|---|
| | k | A14 | A16 | A18 | A20 |
| R1 | −9.87778E+02 | 1.48610E+02 | −2.44410E+02 | 2.17640E+02 | −8.08830E+01 |
| R2 | −3.22225E+01 | 5.59240E+02 | −1.33010E+03 | 1.70920E+03 | −9.04830E+02 |
| R3 | −1.21463E+01 | 1.01100E+03 | −2.10570E+03 | 2.42970E+03 | −1.18080E+03 |
| R4 | −6.00409E+00 | 1.21470E+02 | −1.17700E+02 | 6.40270E+01 | −1.49400E+01 |
| R5 | −1.13926E+01 | 1.04520E+02 | −9.63660E+01 | 4.95230E+01 | −1.08270E+01 |
| R6 | −4.73778E+02 | −1.87520E+01 | 1.54410E+01 | −6.75840E+00 | 1.18410E+00 |
| R7 | −2.19292E+01 | 1.22210E−01 | 3.08890E−02 | −8.06570E−02 | 2.83250E−02 |
| R8 | / | / | / | / | / |
| R9 | −2.19468E+02 | −5.75520E−01 | 1.95970E−01 | −3.95350E−02 | 3.52810E−03 |
| R10 | 3.17363E+00 | −2.18630E−01 | 4.51630E−02 | −5.60740E−03 | 3.18370E−04 |
| R11 | −1.77582E+00 | 1.64730E−01 | −4.30220E−02 | 5.90070E−03 | −3.30320E−04 |
| R12 | −5.29860E+00 | −6.47140E−02 | 1.24850E−02 | −1.39110E−03 | 6.79890E−05 |

For convenience, the aspherical surface of each lens surface is the aspherical surface shown in the following formula (1). However, the present disclosure is not limited to the aspherical polynomial form represented by the formula (1).

$$z = (cr^2)/\{1 + [1 - (k+1)(c^2r^2)]^{1/2}\} + A4r^4 + A6r^6 + A8r^8 + A10r^{10} + A12r^{12} + A14r^{14} + A16r^{16} + A18r^{18} + A20r^{20} \quad (1)$$

k represents the conic coefficient, A4, A6, A8, A10, A12, A14, A16, A18, and A20 represent aspherical coefficient, c represents curvature at the center of the optical surface, r represents the vertical distance between the point on the aspherical curve and the optical axis, and z represents the aspherical depth (the vertical distance between the point on the aspherical surface from the optical axis by r and a tangent plane tangent to the vertex on the optical axis of the aspherical surface).

Tables 3 and 4 show design data of the inflexion points and arrest points of each of the lenses in the camera optical lens 10 according to the first embodiment of the present disclosure. P1R1 and P1R2 respectively represent the object-side surface and the image-side surface of the first lens L1, P2R1 and P2R2 respectively represent the object-side surface and the image-side surface of the second lens L2, P3R1 and P3R2 respectively represent the object-side surface and the image-side surface of the third lens L3, P4R1 and P4R2 respectively represent the object-side surface and the image-side surface of the fourth lens LA, P5R1 and P5R2 respectively represent the object-side surface and the image-side surface of the fifth lens L5, and P6R1 and P6R2 respectively represent the object-side surface and the image-side surface of the sixth lens L6. The data in the column corresponding to "inflexion point position" corresponds to the vertical distance from the inflexion point arranged on the surface of each lens to the optical axis of the camera optical lens 10. The data in the column corresponding to the "arrest point position" corresponds to the vertical distance from the arrest point arranged on the surface of each lens to the optical axis of the camera optical lens 10.

TABLE 3

| | Number of inflexion points | Inflexion point position 1 | Inflexion point position 2 |
|---|---|---|---|
| P1R1 | 1 | 0.025 | |
| P2R2 | 1 | 0.585 | |
| P3R2 | 2 | 0.165 | 0.865 |

TABLE 3-continued

| | Number of inflexion points | Inflexion point position 1 | Inflexion point position 2 |
|---|---|---|---|
| P4R1 | 1 | 0.515 | |
| P5R1 | 1 | 0.705 | |
| P5R2 | 2 | 0.735 | 1.685 |
| P6R1 | 2 | 0.625 | 1.505 |
| P6R2 | 1 | 0.605 | |

TABLE 4

| | Number of arrest points | Arrest point position 1 | Arrest point position 2 |
|---|---|---|---|
| P1R1 | 1 | 0.045 | |
| P3R2 | 1 | 0.285 | |
| P5R1 | 1 | 1.165 | |
| P5R2 | 2 | 1.485 | 1.755 |
| P6R1 | 2 | 1.315 | 1.785 |
| P6R2 | 1 | 1.365 | |

Figure 2:
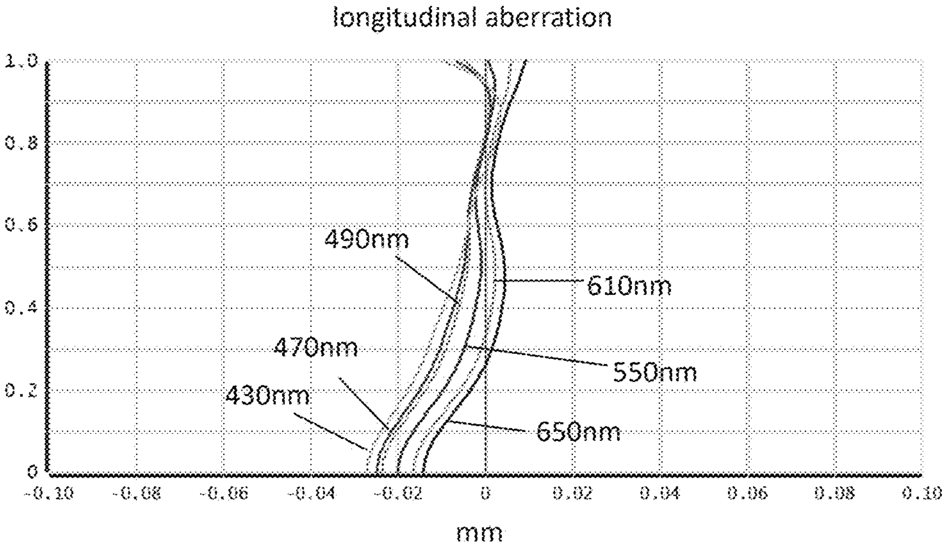
FIG. 2 is a schematic view of longitudinal aberration of the camera optical lens shown in FIG. 1.
Figure 3:
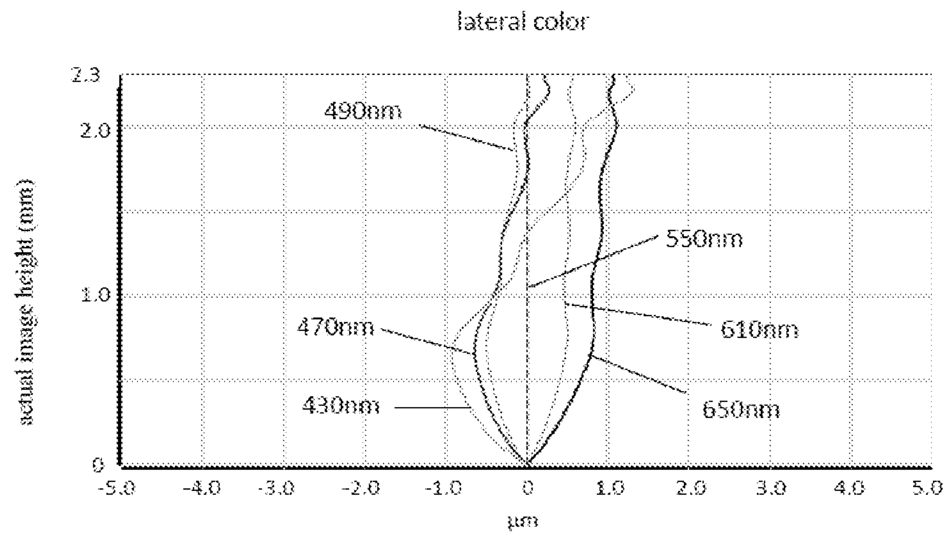
FIG. 3 is a schematic diagram of lateral color of the camera optical lens shown in FIG. 1.
Figure 4:
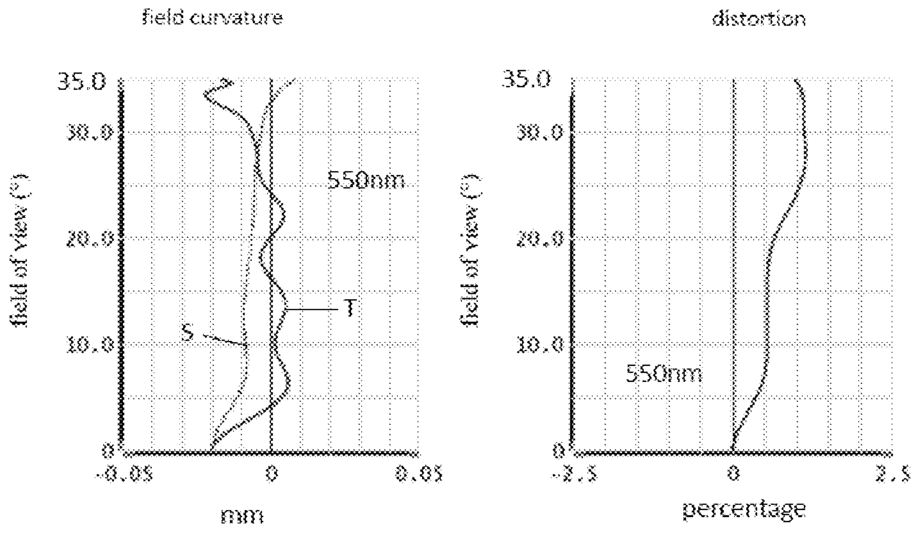
FIG. 4 is a schematic diagram of field curvature and distortion of the camera optical lens shown in FIG. 1.

FIGS. 2 and 3 show diagrams of longitudinal aberrations and lateral colors after light with a wavelength of 650 nm, 610 nm, 550 nm, 490 nm, 470 nm, and 430 nm passes the camera optical lens 10 of the first embodiment, respectively. FIG. 4 shows a schematic diagram of a field curvature and distortion after light with a wavelength of 550 nm passes the camera optical lens 10 of the first embodiment. The field curvature S in FIG. 4 is a field curvature in the sagittal direction, and T is a field curvature in the meridian direction.

In this embodiment, the entrance pupil diameter ENPD of the camera optical lens 10 is 1.325 mm, an image height IH of 1.0H is 2.300 mm, and the field of view FOV in the diagonal direction is 70.00°. The camera optical lens 10 meets the design requirements of large aperture, ultra-thin, wide-angle, and small head, and the on-axis and off-axis chromatic aberrations are fully corrected, thus having excellent optical characteristics.

Second Embodiment

The meaning of symbols of the second embodiment is the same as that of the first embodiment.

Figure 5:
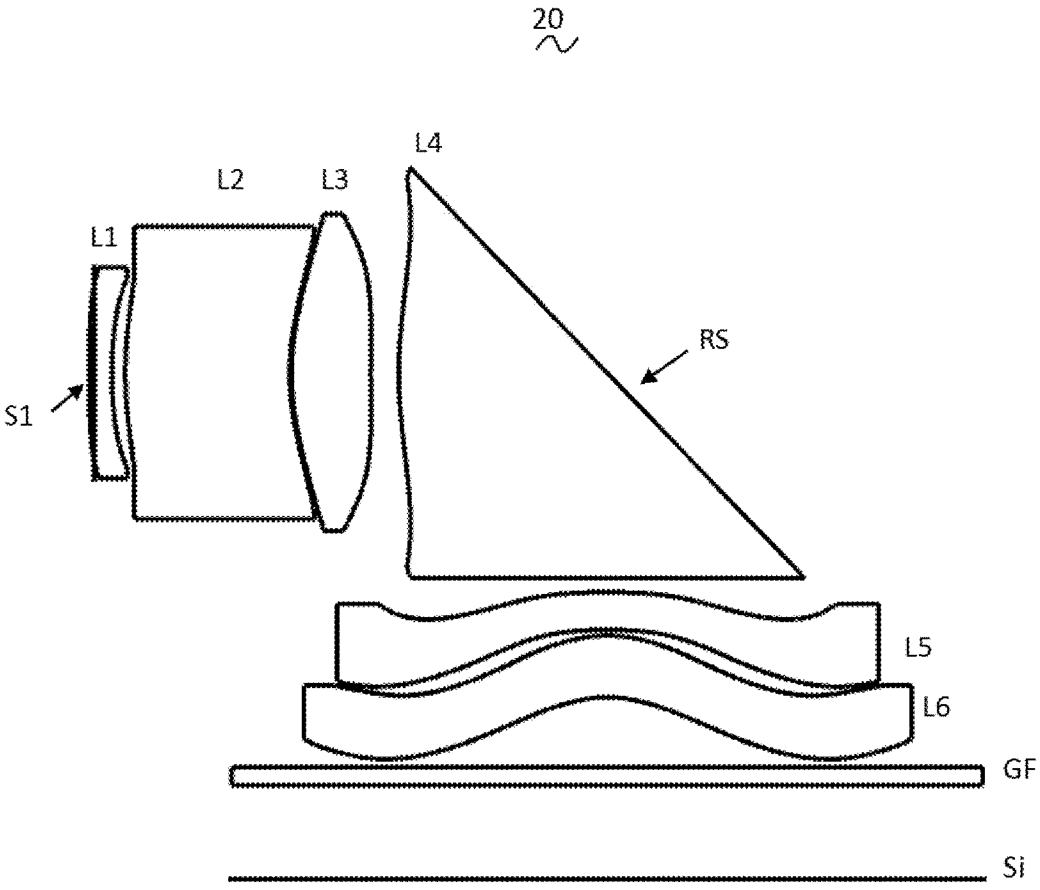
FIG. 5 is a schematic structural diagram of a camera optical lens according to a second embodiment of the present disclosure.

FIG. 5 shows a camera optical lens 20 according to a second embodiment of the present disclosure.

Tables 5 and 6 show design data of the camera optical lens 20 according to the second embodiment of the present disclosure.

TABLE 5

| | R | | d | | nd | | vd |
|---|---|---|---|---|---|---|---|
| S1 | ∞ | d0 = | −0.027 | | | | |
| R1 | 520.032 | d1 = | 0.141 | nd1 | 1.5584 | ν1 | 54.16 |
| R2 | 2.587 | d2 = | 0.084 | | | | |
| R3 | 2.171 | d3 = | 1.031 | nd2 | 1.6635 | ν2 | 20.95 |
| R4 | 1.366 | d4 = | 0.012 | | | | |
| R5 | 1.333 | d5 = | 0.499 | nd3 | 1.5444 | ν3 | 51.24 |
| R6 | 7.982 | d6 = | 0.178 | | | | |
| R7 | 2.505 | d7 = | 2.557 | nd4 | 1.9000 | ν4 | 40.00 |
| R8 | 0.000 | d8 = | 0.080 | | | | |
| R9 | 7.915 | d9 = | 0.228 | nd5 | 1.6499 | ν5 | 21.26 |
| R10 | 3.941 | d10 = | 0.034 | | | | |
| R11 | 0.908 | d11 = | 0.374 | nd6 | 1.5444 | ν6 | 55.81 |
| R12 | 0.838 | d12 = | 0.424 | | | | |
| R13 | ∞ | d13 = | 0.110 | ndg | 1.5200 | νg | 64.20 |
| R14 | ∞ | d14 = | 0.566 | | | | |

Table 6 shows aspherical data of each lens in the camera optical lens 20 according to the second embodiment of the present disclosure.

TABLE 6

| | Conic coefficient | Aspherical coefficient | | | | |
|---|---|---|---|---|---|---|
| | k | A4 | A6 | A8 | A10 | A12 |
| R1 | 6.6512E+05 | 4.3593E−01 | −3.8671E−01 | −5.0259E−01 | 1.0651E+01 | −5.2544E+01 |
| R2 | −3.6491E+01 | 4.9970E−01 | −4.7121E−01 | 8.1972E−02 | 1.7634E+01 | −1.3555E+02 |
| R3 | −1.6973E+01 | −4.7206E−02 | 2.4390E−01 | −5.4805E+00 | 5.2869E+01 | −2.9432E+02 |
| R4 | −6.3305E+00 | −2.3044E−01 | 1.6888E+00 | −9.2630E+00 | 3.2916E+01 | −7.8011E+01 |
| R5 | −1.0375E+01 | −1.4793E−01 | 1.6838E+00 | −9.0728E+00 | 3.0913E+01 | −7.0222E+01 |
| R6 | −7.2119E+02 | −3.6025E−01 | 3.6714E−02 | 1.2860E+00 | −5.7538E+00 | 1.3458E+01 |
| R7 | −2.2470E+01 | −4.6240E−02 | −2.6480E−03 | −3.9408E−02 | 1.1325E−01 | −1.8775E−01 |
| R8 | / | / | / | / | / | / |
| R9 | −2.0547E+02 | 7.2349E−01 | −1.5369E+00 | 1.8758E+00 | −1.6776E+00 | 1.1442E+00 |
| R10 | 3.2411E+00 | 8.9670E−01 | −1.9342E+00 | 2.1355E+00 | −1.4948E+00 | 6.9625E−01 |
| R11 | −1.7408E+00 | −1.2768E−01 | −2.4242E−03 | −1.8904E−01 | 4.0173E−01 | −3.5191E−01 |
| R12 | −4.8965E+00 | 1.6036E−01 | −5.1154E−01 | 6.2308E−01 | −4.5503E−01 | 2.1274E−01 |

| | Conic coefficient | Aspherical coefficient | | | |
|---|---|---|---|---|---|
| | k | A14 | A16 | A18 | A20 |
| R1 | 6.6512E+05 | 1.4794E+02 | −2.4676E+02 | 2.1468E+02 | −6.3889E+01 |
| R2 | −3.6491E+01 | 5.5746E+02 | −1.3347E+03 | 1.7062E+03 | −8.4060E+02 |
| R3 | −1.6973E+01 | 1.0093E+03 | −2.1093E+03 | 2.4297E+03 | −1.1422E+03 |
| R4 | −6.3305E+00 | 1.2140E+02 | −1.1788E+02 | 6.3860E+01 | −1.4541E+01 |
| R5 | −1.0375E+01 | 1.0448E+02 | −9.6415E+01 | 4.9505E+01 | −1.0702E+01 |
| R6 | −7.2119E+02 | −1.8758E+01 | 1.5436E+01 | −6.7675E+00 | 1.2107E+00 |
| R7 | −2.2470E+01 | 1.2303E−01 | 3.3910E−02 | −7.8093E−02 | 2.6303E−02 |
| R8 | / | / | / | / | / |
| R9 | −2.0547E+02 | −5.7554E−01 | 1.9596E−01 | −3.9539E−02 | 3.5255E−03 |
| R10 | 3.2411E+00 | −2.1863E−01 | 4.5163E−02 | −5.6073E−03 | 3.1851E−04 |
| R11 | −1.7408E+00 | 1.6473E−01 | −4.3022E−02 | 5.9006E−03 | −3.3038E−04 |
| R12 | −4.8965E+00 | −6.4715E−02 | 1.2485E−02 | −1.3910E−03 | 6.8016E−05 |

Tables 7 and 8 show design data of the inflexion points and arrest points of each of the lenses in the camera optical lens 20 according to the second embodiment of the present disclosure.

TABLE 7

| | Number of inflexion points | Inflexion point position 1 | Inflexion point position 2 |
|---|---|---|---|
| P2R1 | 2 | 0.495 | 0.575 |
| P2R2 | 1 | 0.605 | |
| P3R2 | 2 | 0.155 | 0.885 |
| P4R1 | 1 | 0.505 | |
| P5R1 | 1 | 0.695 | |
| P5R2 | 2 | 0.735 | 1.715 |
| P6R1 | 1 | 0.625 | |
| P6R2 | 1 | 0.615 | |

TABLE 8

| | Number of arrest points | Arrest point position 1 |
|---|---|---|
| P3R2 | 1 | 0.265 |
| P4R1 | 1 | 0.915 |
| P5R1 | 1 | 1.135 |
| P5R2 | 1 | 1.445 |
| P6R1 | 1 | 1.295 |
| P6R2 | 1 | 1.395 |

Figure 6:
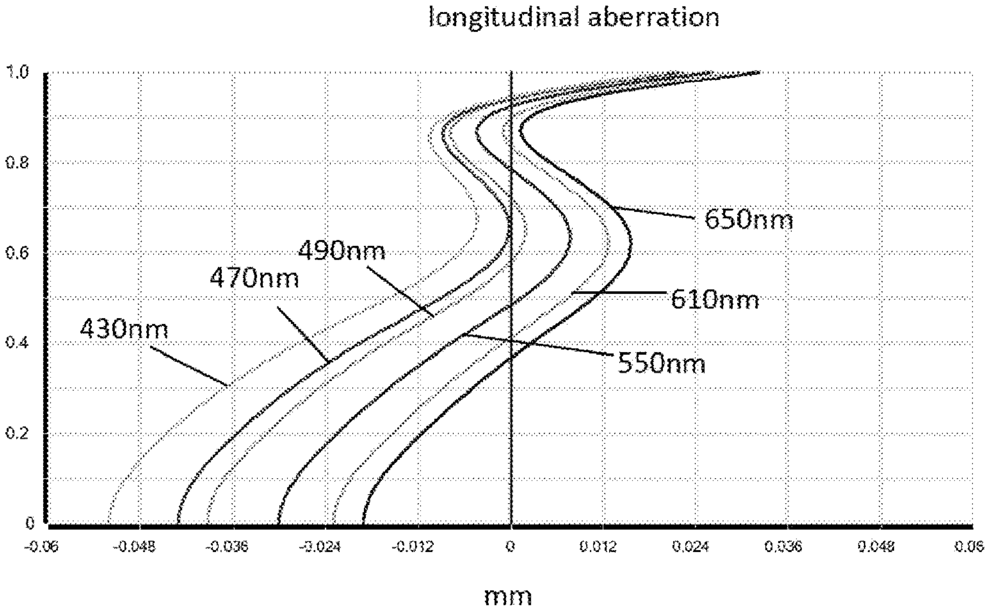
FIG. 6 is a schematic view of longitudinal aberration of the camera optical lens shown in FIG. 5.
Figure 7:
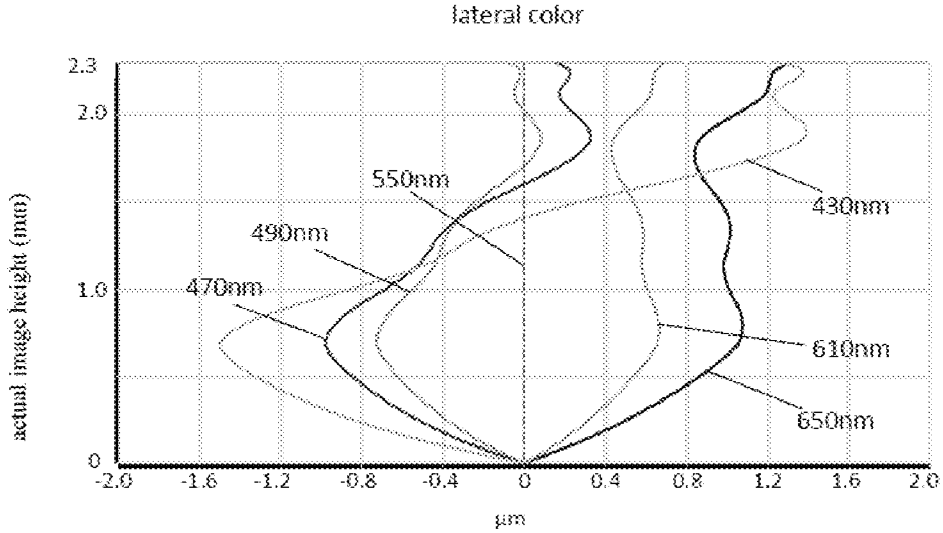
FIG. 7 is a schematic diagram of lateral color of the camera optical lens shown in FIG. 5.
Figure 8:
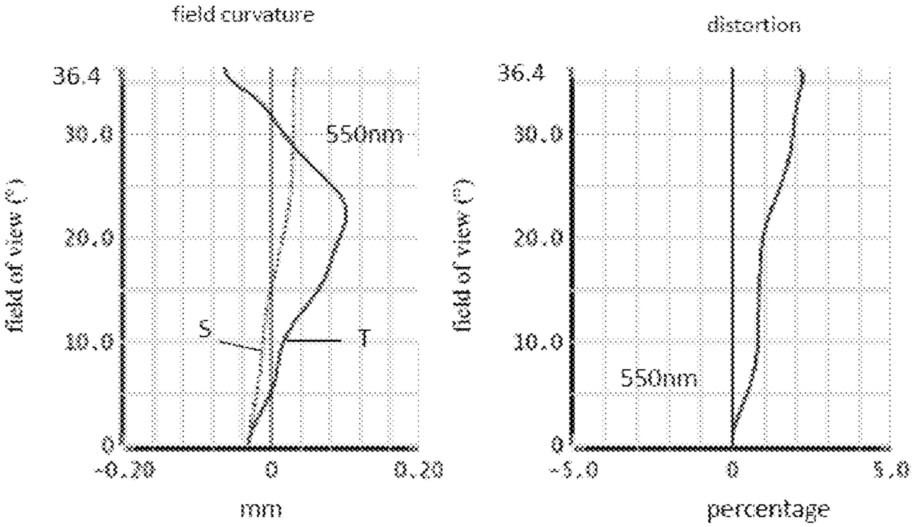
FIG. 8 is a schematic diagram of field curvature and distortion of the camera optical lens shown in FIG. 5.

FIGS. 6 and 7 show diagrams of longitudinal aberrations and lateral colors after light with a wavelength of 650 nm, 610 nm, 550 nm, 490 nm, 470 nm, and 430 nm passes the camera optical lens 20 of the second embodiment, respectively. FIG. 8 shows a schematic diagram of a field curvature and distortion after light with a wavelength of 550 nm passes the camera optical lens 20 of the second embodiment. The field curvature S in FIG. 8 is a field curvature in the sagittal direction, and T is a field curvature in the meridian direction.

In this embodiment, the entrance pupil diameter ENPD of the camera optical lens 20 is 1.206 mm, an image height IH of 1.0H is 2.300 mm, and the field of view FOV in the diagonal direction is 72.85°. The camera optical lens 20 meets the design requirements of large aperture, ultra-thin, wide-angle, and small head, and the on-axis and off-axis chromatic aberrations are fully corrected, thus having excellent optical characteristics.

Third Embodiment

The meaning of symbols of the third embodiment is the same as that of the first embodiment.

Figure 9:
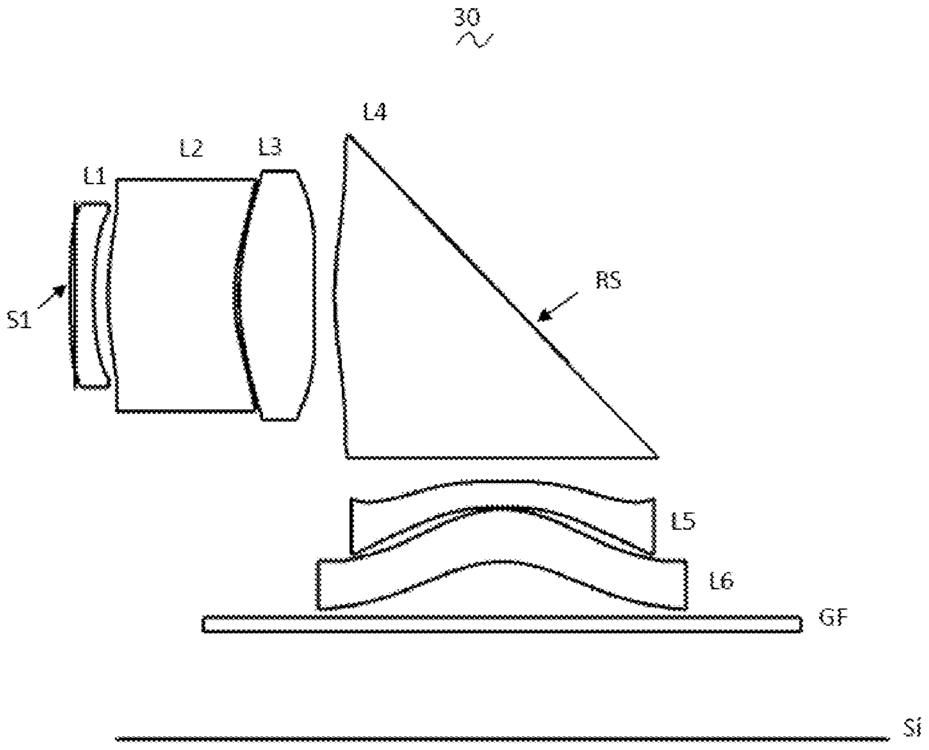
FIG. 9 is a schematic structural diagram of a camera optical lens according to a third embodiment of the present disclosure.

FIG. 9 shows a camera optical lens 30 according to a third embodiment of the present disclosure.

Tables 9 and 10 show design data of the camera optical lens 30 according to the third embodiment of the present disclosure.

TABLE 9

| | R | | d | | nd | | vd |
|---|---|---|---|---|---|---|---|
| S1 | ∞ | d0 = | −0.037 | | | | |
| R1 | −18904.483 | d1 = | 0.184 | nd1 | 1.5444 | v1 | 55.81 |
| R2 | 3.773 | d2 = | 0.114 | | | | |
| R3 | 2.470 | d3 = | 1.002 | nd2 | 1.6610 | v2 | 20.53 |
| R4 | 1.350 | d4 = | 0.033 | | | | |
| R5 | 1.535 | d5 = | 0.597 | nd3 | 1.5444 | v3 | 55.81 |
| R6 | 6.692 | d6 = | 0.161 | | | | |
| R7 | 2.496 | d7 = | 2.565 | nd4 | 1.9000 | v4 | 40.00 |
| R8 | 0.000 | d8 = | 0.176 | | | | |
| R9 | 10.618 | d9 = | 0.199 | nd5 | 1.6499 | v5 | 21.26 |
| R10 | 3.787 | d10 = | 0.013 | | | | |
| R11 | 0.876 | d11 = | 0.398 | nd6 | 1.5444 | v6 | 55.81 |
| R12 | 0.872 | d12 = | 0.428 | | | | |
| R13 | ∞ | d13 = | 0.110 | ndg | 1.5200 | vg | 64.20 |
| R14 | ∞ | d14 = | 0.807 | | | | |

Table 10 shows aspherical data of each lens in the camera optical lens 30 according to the third embodiment of the present disclosure.

TABLE 10

| | Conic coefficient | Aspherical coefficient | | | | |
|---|---|---|---|---|---|---|
| | k | A4 | A6 | A8 | A10 | A12 |
| R1 | 4.2049E−01 | −3.6956E−01 | −5.6386E−01 | 1.0436E+01 | −5.2566E+01 | 1.4885E+02 |
| R2 | −3.1311E+01 | 4.9498E−01 | −5.4716E−01 | 3.3957E−02 | 1.7688E+01 | −1.3507E+02 |
| R3 | −1.0467E+01 | −3.3602E−02 | 2.0735E−01 | −5.5302E+00 | 5.2878E+01 | −2.9390E+02 |
| R4 | −5.8751E+00 | −2.2442E−01 | 1.6891E+00 | −9.2859E+00 | 3.2874E+01 | −7.8028E+01 |
| R5 | −1.1696E+01 | −1.6030E−01 | 1.6700E+00 | −9.0732E+00 | 3.0926E+01 | −7.0195E+01 |
| R6 | −4.5972E+02 | −3.5344E−01 | 4.5139E−02 | 1.2939E+00 | −5.7470E+00 | 1.3466E+01 |
| R7 | −2.2161E+01 | −4.5018E−02 | −1.5003E−03 | −3.3246E−02 | 1.2029E−01 | −1.8450E−01 |
| R8 | / | / | / | / | / | / |
| R9 | −7.7245E+01 | 7.3017E−01 | −1.5355E+00 | 1.8759E+00 | −1.6776E+00 | 1.1443E+00 |
| R10 | 3.1732E+00 | 8.9604E−01 | −1.9349E+00 | 2.1355E+00 | −1.4948E+00 | 6.9626E−01 |
| R11 | −1.7737E+00 | −1.2486E−01 | −1.7458E−03 | −1.8905E−01 | 4.0171E−01 | −3.5191E−01 |
| R12 | −5.3865E+00 | 1.6083E−01 | −5.1304E−01 | 6.2323E−01 | −4.5500E−01 | 2.1275E−01 |

| | Conic coefficient | Aspherical coefficient | | | |
|---|---|---|---|---|---|
| | k | A14 | A16 | A18 | A20 |
| R1 | 4.2049E−01 | −2.4391E+02 | 2.1786E+02 | −8.3792E+01 | 0.0000E+00 |
| R2 | −3.1311E+01 | 5.5947E+02 | −1.3297E+03 | 1.7087E+03 | −9.1206E+02 |
| R3 | −1.0467E+01 | 1.0111E+03 | −2.1059E+03 | 2.4289E+03 | −1.1838E+03 |
| R4 | −5.8751E+00 | 1.2147E+02 | −1.1770E+02 | 6.4034E+01 | −1.4928E+01 |
| R5 | −1.1696E+01 | 1.0452E+02 | −9.6365E+01 | 4.9523E+01 | −1.0824E+01 |
| R6 | −4.5972E+02 | −1.8751E+01 | 1.5443E+01 | −6.7581E+00 | 1.1831E+00 |
| R7 | −2.2161E+01 | 1.2185E−01 | 3.0632E−02 | −8.0512E−02 | 2.8209E−02 |
| R8 | / | / | / | / | / |
| R9 | −7.7245E+01 | −5.7552E−01 | 1.9597E−01 | −3.9535E−02 | 3.5279E−03 |
| R10 | 3.1732E+00 | −2.1863E−01 | 4.5163E−02 | −5.6074E−03 | 3.1836E−04 |
| R11 | −1.7737E+00 | 1.6473E−01 | −4.3022E−02 | 5.9007E−03 | −3.3035E−04 |
| R12 | −5.3865E+00 | −6.4715E−02 | 1.2485E−02 | −1.3911E−03 | 6.7987E−05 |

Tables 11 and 12 show design data of the inflexion points and arrest points of each of the lenses in the camera optical lens 30 according to the third embodiment of the present disclosure.

TABLE 11

| | Number of inflexion points | Inflexion point position 1 | Inflexion point position 2 | Inflexion point position 3 | Inflexion point position 4 | Inflexion point position 5 |
|---|---|---|---|---|---|---|
| P2R2 | 1 | 0.585 | | | | |
| P3R2 | 2 | 0.165 | 0.855 | | | |
| P4R1 | 1 | 0.525 | | | | |
| P5R1 | 2 | 0.725 | 1.525 | | | |
| P5R2 | 2 | 0.735 | 1.685 | | | |
| P6R1 | 5 | 0.625 | 1.515 | 1.665 | 1.725 | 2.095 |
| P6R2 | 1 | 0.605 | | | | |

TABLE 12

| | Number of arrest points | Arrest point position 1 | Arrest point position 2 | Arrest point position 3 |
|---|---|---|---|---|
| P3R2 | 1 | 0.285 | | |
| P5R1 | 1 | 1.205 | | |
| P5R2 | 1 | 1.475 | | |
| P6R1 | 3 | 1.335 | 1.795 | 2.155 |
| P6R2 | 1 | 1.345 | | |

Figure 10:
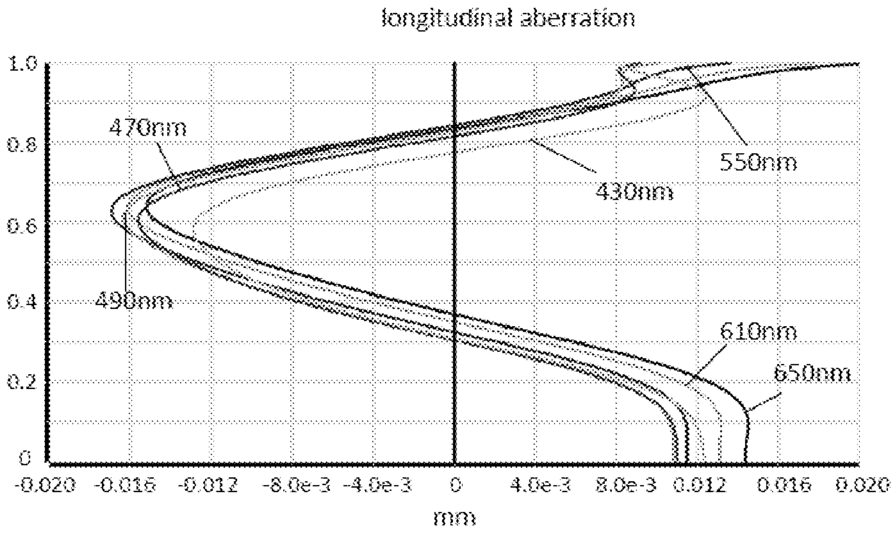
FIG. 10 is a schematic view of longitudinal aberration of the camera optical lens shown in FIG. 9.
Figure 11:
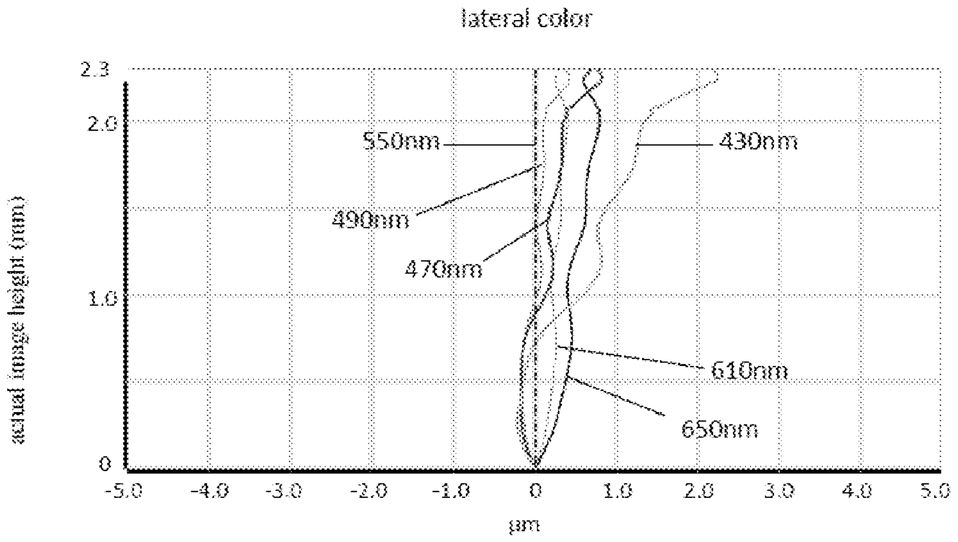
FIG. 11 is a schematic diagram of lateral color of the camera optical lens shown in FIG. 9.
Figure 12:
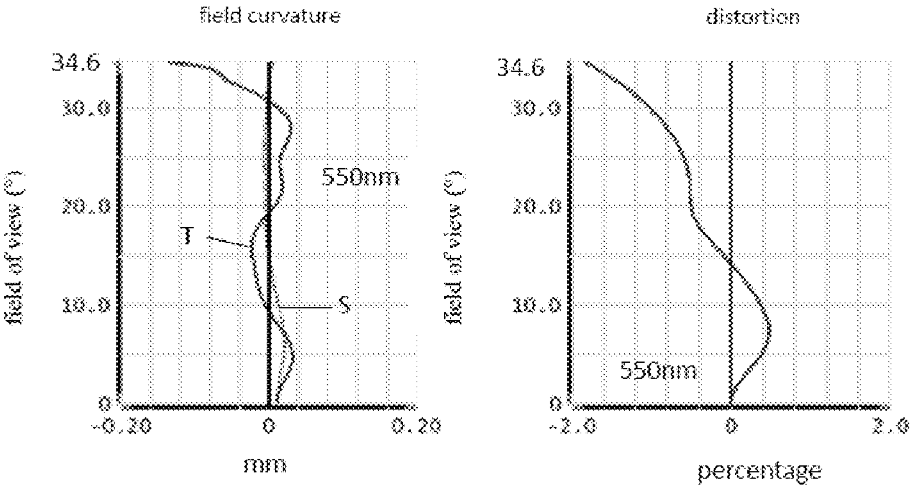
FIG. 12 is a schematic diagram of field curvature and distortion of the camera optical lens shown in FIG. 9.

FIGS. 10 and 11 show diagrams of longitudinal aberrations and lateral colors after light with a wavelength of 650 nm, 610 nm, 550 nm, 490 nm, 470 nm, and 430 nm passes the camera optical lens 30 of the third embodiment, respectively. FIG. 12 shows a schematic diagram of a field curvature and distortion after light with a wavelength of 550 nm passes the camera optical lens 30 of the third embodiment. The field curvature S in FIG. 12 is a field curvature in the sagittal direction, and T is a field curvature in the meridian direction.

In this embodiment, the entrance pupil diameter ENPD of the camera optical lens 30 is 1.357 mm, an image height IH of 1.0H is 2.300 mm, and the field of view FOV in the diagonal direction is 69.16°. The camera optical lens 30 meets the design requirements of large aperture, ultra-thin, wide-angle, and small head, and the on-axis and off-axis chromatic aberrations are fully corrected, thus having excellent optical characteristics.

Fourth Embodiment

The meaning of symbols of the fourth embodiment is the same as that of the first embodiment.

Figure 13:
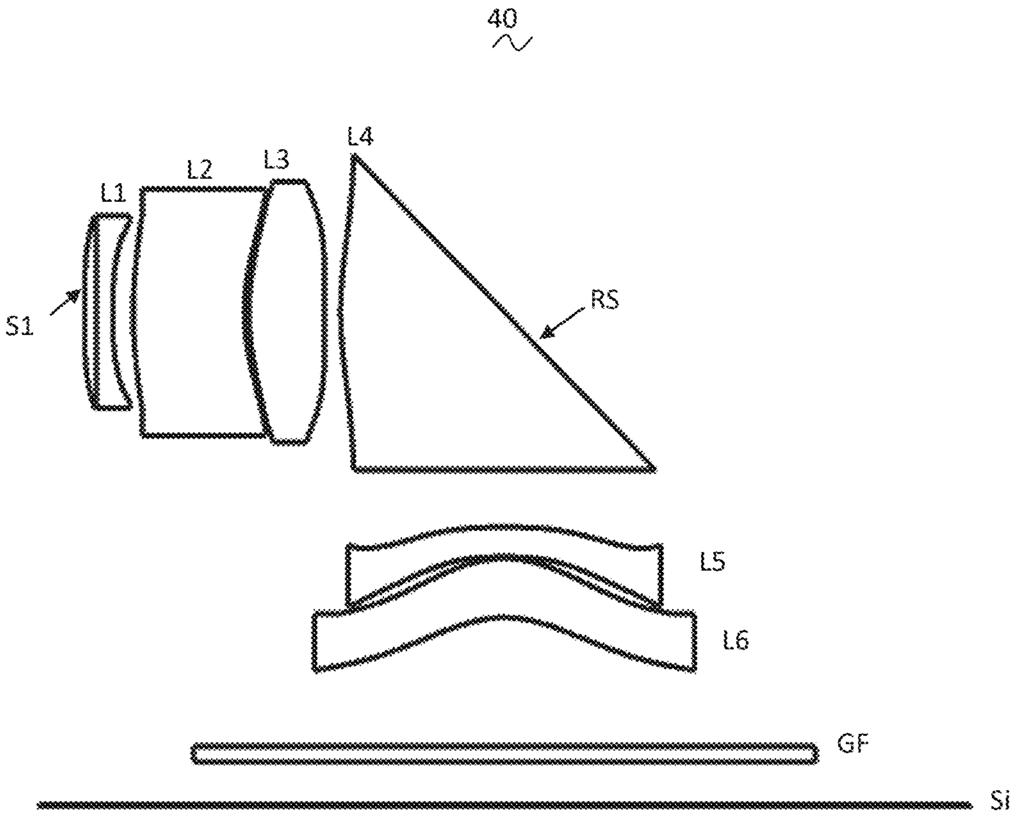
FIG. 13 is a schematic structural diagram of a camera optical lens according to a fourth embodiment of the present disclosure.

FIG. 13 shows a camera optical lens 40 according to a fourth embodiment of the present disclosure.

Tables 13 and 14 show design data of the camera optical lens 40 according to the fourth embodiment of the present disclosure.

TABLE 13

| | R | | d | | nd | | vd |
|---|---|---|---|---|---|---|---|
| S1 | ∞ | d0 = | −0.088 | | | | |
| R1 | 160.721 | d1 = | 0.214 | nd1 | 1.5444 | v1 | 55.81 |
| R2 | 4.652 | d2 = | 0.155 | | | | |
| R3 | 2.958 | d3 = | 0.846 | nd2 | 1.6610 | v2 | 20.53 |
| R4 | 1.312 | d4 = | 0.035 | | | | |
| R5 | 1.562 | d5 = | 0.570 | nd3 | 1.5444 | v3 | 55.81 |
| R6 | 6.103 | d6 = | 0.127 | | | | |
| R7 | 2.355 | d7 = | 2.400 | nd4 | 1.9000 | v4 | 40.00 |
| R8 | 0.000 | d8 = | 0.418 | | | | |
| R9 | 13.100 | d9 = | 0.215 | nd5 | 1.6499 | v5 | 21.26 |
| R10 | 3.757 | d10 = | 0.012 | | | | |
| R11 | 0.876 | d11 = | 0.431 | nd6 | 1.5444 | v6 | 55.81 |
| R12 | 0.888 | d12 = | 0.942 | | | | |
| R13 | ∞ | d13 = | 0.110 | ndg | 1.5200 | vg | 64.20 |
| R14 | ∞ | d14 = | 0.321 | | | | |

Table 14 shows aspherical data of each lens in the camera optical lens 40 according to the fourth embodiment of the present disclosure.

TABLE 14

| | Conic coefficient | Aspherical coefficient | | | | |
|---|---|---|---|---|---|---|
| | k | A4 | A6 | A8 | A10 | A12 |
| R1 | −1.4365E+05 | 4.2238E−01 | −3.9062E−01 | −5.4404E−01 | 1.0475E+01 | −5.2610E+01 |
| R2 | −1.4050E+01 | 5.1075E−01 | −4.9332E−01 | 5.5296E−02 | 1.7672E+01 | −1.3518E+02 |
| R3 | −1.0926E+01 | −2.8990E−02 | 2.2571E−01 | −5.5051E+00 | 5.2891E+01 | −2.9393E+02 |
| R4 | −6.1802E+00 | −2.2834E−01 | 1.6890E+00 | −9.2847E+00 | 3.2877E+01 | −7.8028E+01 |
| RS | −1.2185E+01 | −1.6131E−01 | 1.6701E+00 | −9.0764E+00 | 3.0924E+01 | −7.0194E+01 |
| R6 | −3.5841E+02 | −3.5407E−01 | 4.3627E−02 | 1.2928E+00 | −5.7470E+00 | 1.3466E+01 |
| R7 | −2.2094E+01 | −4.3278E−02 | 5.7915E−04 | −3.3280E−02 | 1.2024E−01 | −1.8452E−01 |
| R8 | / | / | / | / | / | / |
| R9 | −4.8826E+01 | 7.3012E−01 | −1.5358E+00 | 1.8758E+00 | −1.6777E+00 | 1.1442E+00 |
| R10 | 3.2012E+00 | 8.9497E−01 | −1.9344E+00 | 2.1355E+00 | −1.4948E+00 | 6.9626E−01 |
| R11 | −1.7545E+00 | −1.2314E−01 | −1.3781E−03 | −1.8900E−01 | 4.0172E−01 | −3.5191E−01 |
| R12 | −5.6478E+00 | 1.6673E−01 | −5.1193E−01 | 6.2328E−01 | −4.5502E−01 | 2.1274E−01 |

| | Conic coefficient | Aspherical coefficient | | | |
|---|---|---|---|---|---|
| | k | A14 | A16 | A18 | A20 |
| R1 | −1.4365E+05 | 1.4860E+02 | −2.4442E+02 | 2.1770E+02 | −8.1300E+01 |
| R2 | −1.4050E+01 | 5.5913E+02 | −1.3305E+03 | 1.7080E+03 | −9.0852E+02 |
| R3 | −1.0926E+01 | 1.0110E+03 | −2.1061E+03 | 2.4286E+03 | −1.1834E+03 |
| R4 | −6.1802E+00 | 1.2146E+02 | −1.1770E+02 | 6.4033E+01 | −1.4926E+01 |
| R5 | −1.2185E+01 | 1.0453E+02 | −9.6363E+01 | 4.9524E+01 | −1.0826E+01 |
| R6 | −3.5841E+02 | −1.8750E+01 | 1.5443E+01 | −6.7575E+00 | 1.1845E+00 |
| R7 | −2.2094E+01 | 1.2190E−01 | 3.0707E−02 | −8.0706E−02 | 2.8434E−02 |
| R8 | / | / | / | / | / |
| R9 | −4.8826E+01 | −5.7553E−01 | 1.9597E−01 | −3.9535E−02 | 3.5276E−03 |
| R10 | 3.2012E+00 | −2.1863E−01 | 4.5162E−02 | −5.6075E−03 | 3.1840E−04 |
| R11 | −1.7545E+00 | 1.6473E−01 | −4.3022E−02 | 5.9005E−03 | −3.3041E−04 |
| R12 | −5.6478E+00 | −6.4716E−02 | 1.2485E−02 | −1.3911E−03 | 6.8011E−05 |

Tables 15 and 16 show design data of the inflexion points and arrest points of each of the lenses in the camera optical lens 40 according to the fourth embodiment of the present disclosure.

TABLE 15

| | Number of inflexion points | Inflexion point position 1 | Inflexion point position 2 | Inflexion point position 3 |
|---|---|---|---|---|
| P2R2 | 1 | 0.575 | | |
| P3R2 | 2 | 0.175 | 0.855 | |
| P4R1 | 2 | 0.525 | 1.085 | |

TABLE 15-continued

| | Number of inflexion points | Inflexion point position 1 | Inflexion point position 2 | Inflexion point position 3 |
|---|---|---|---|---|
| P5R1 | 1 | 0.725 | | |
| P5R2 | 2 | 0.735 | 1.665 | |
| P6R1 | 3 | 0.625 | 1.495 | 1.655 |
| P6R2 | 1 | 0.615 | | |

TABLE 16

| | Number of arrest points | Arrest point position 1 |
|---|---|---|
| P3R2 | 1 | 0.295 |
| P5R1 | 1 | 1.185 |
| P5R2 | 1 | 1.495 |
| P6R1 | 1 | 1.375 |
| P6R2 | 1 | 1.435 |
| P6R2 | 1 | 1.495 |

Figure 14:
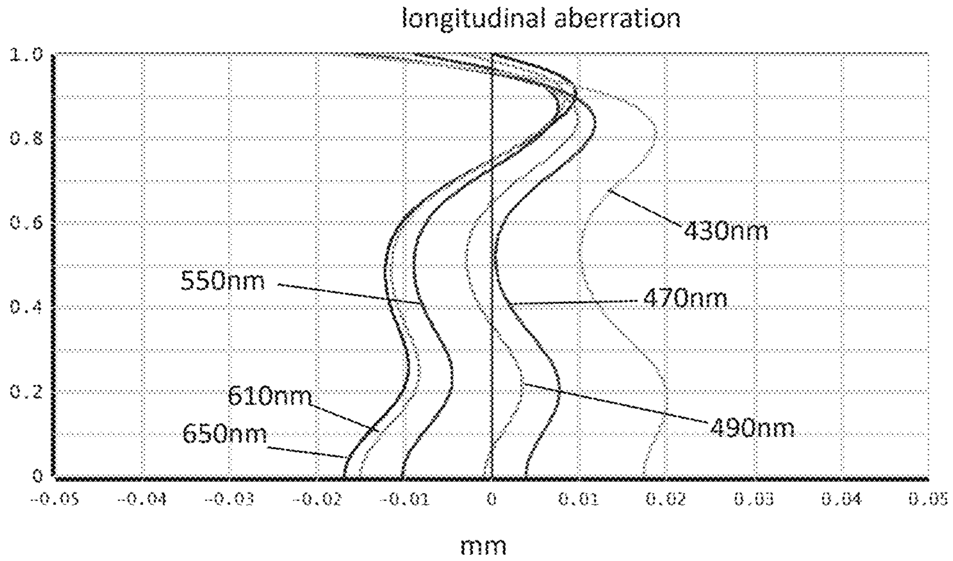
FIG. 14 is a schematic view of the longitudinal aberration of the camera optical lens shown in FIG. 13.
Figure 15:
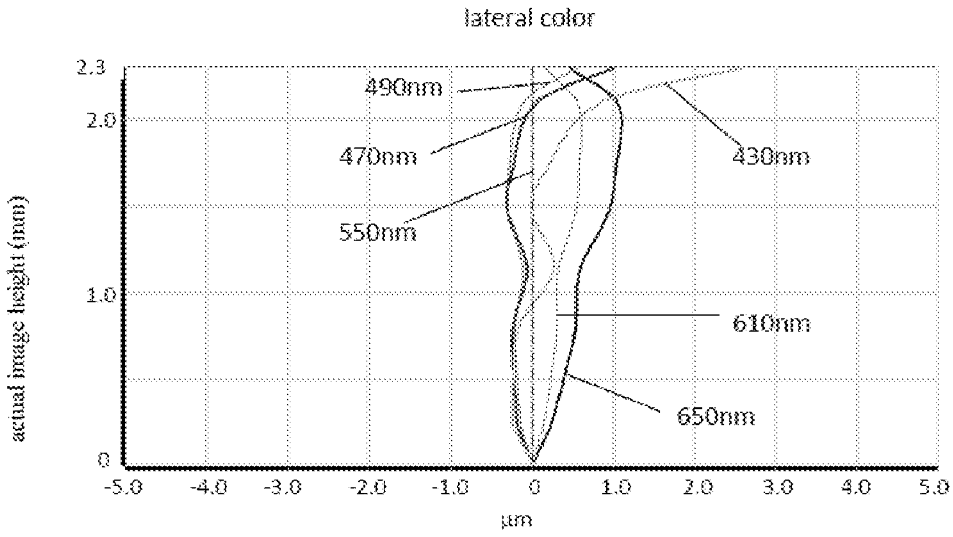
FIG. 15 is a schematic diagram of lateral color of the camera optical lens shown in FIG. 13.
Figure 16:
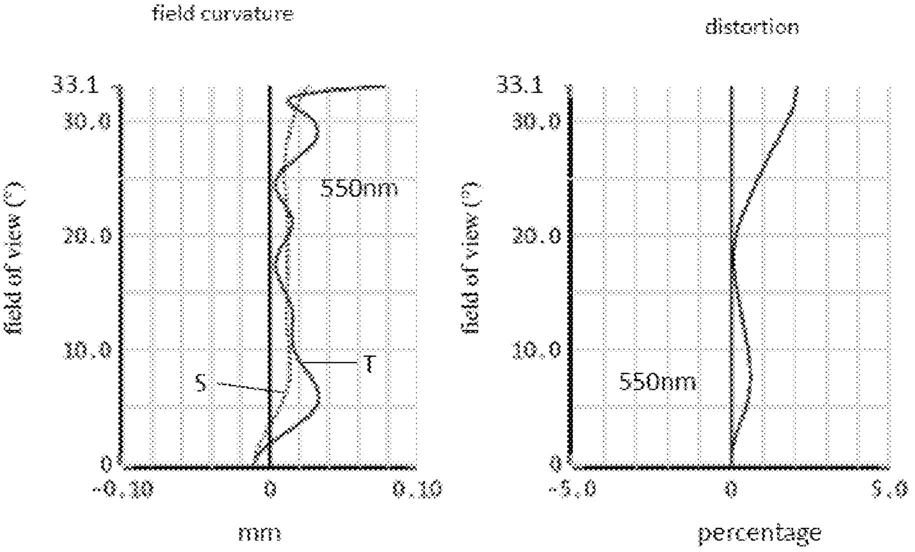
FIG. 16 is a schematic diagram of field curvature and distortion of the camera optical lens shown in FIG. 13.

FIGS. 14 and 15 show diagrams of longitudinal aberrations and lateral colors after light with a wavelength of 650 nm, 610 nm, 550 nm, 490 nm, 470 nm, and 430 nm passes the camera optical lens 40 of the fourth embodiment, respectively. FIG. 16 shows a schematic diagram of a field curvature and distortion after light with a wavelength of 550 nm passes the camera optical lens 40 of the fourth embodiment. The field curvature S in FIG. 16 is a field curvature in the sagittal direction, and T is a field curvature in the meridian direction.

In this embodiment, the entrance pupil diameter ENPD of the camera optical lens 40 is 1.375 mm, an image height IH of 1.0H is 2.300 mm, and the field of view FOV in the diagonal direction is 66.13°. The camera optical lens 40 meets the design requirements of large aperture, ultra-thin, wide-angle, and small head, and the on-axis and off-axis chromatic aberrations are fully corrected, thus having excellent optical characteristics.

Fifth Embodiment

The meaning of symbols of the fifth embodiment is the same as that of the first embodiment.

Figure 17:
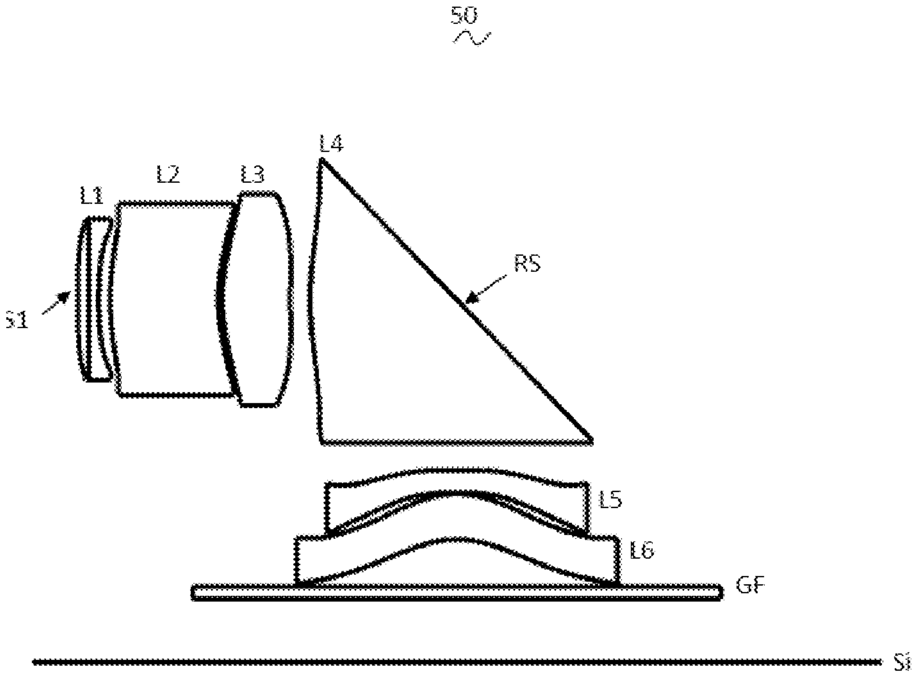
FIG. 17 is a schematic structural diagram of a camera optical lens according to a fifth embodiment of the present disclosure.

FIG. 17 shows a camera optical lens 50 according to a fifth embodiment of the present disclosure.

Tables 17 and 18 show design data of the camera optical lens 50 according to the fifth embodiment of the present disclosure.

TABLE 17

| | R | d | | nd | | vd | |
|---|---|---|---|---|---|---|---|
| S1 | ∞ | d0 = | −0.096 | | | | |
| R1 | −255.912 | d1 = | 0.182 | nd1 | 1.5584 | v1 | 54.16 |
| R2 | 3.674 | d2 = | 0.106 | | | | |
| R3 | 2.366 | d3 = | 0.963 | nd2 | 1.6480 | v2 | 21.00 |
| R4 | 1.366 | d4 = | 0.043 | | | | |
| R5 | 1.501 | d5 = | 0.606 | nd3 | 1.5437 | v3 | 66.00 |
| R6 | 6.537 | d6 = | 0.177 | | | | |
| R7 | 2.422 | d7 = | 2.543 | nd4 | 1.9000 | v4 | 40.00 |
| R8 | 0.000 | d8 = | 0.236 | | | | |
| R9 | 18.679 | d9 = | 0.195 | nd5 | 1.6499 | v5 | 21.26 |
| R10 | 3.743 | d10 = | 0.012 | | | | |
| R11 | 0.891 | d11 = | 0.390 | nd6 | 1.5444 | v6 | 55.81 |
| R12 | 0.878 | d12 = | 0.402 | | | | |
| R13 | ∞ | d13 = | 0.110 | ndg | 1.5200 | vg | 64.20 |
| R14 | ∞ | d14 = | 0.552 | | | | |

Table 18 shows aspherical data of each lens in the camera optical lens 50 according to the fifth embodiment of the present disclosure.

TABLE 18

| | Conic coefficient | Aspherical coefficient | | | | |
|---|---|---|---|---|---|---|
| | k | A4 | A6 | A8 | A10 | A12 |
| R1 | 9.7813E+04 | 4.2050E−01 | −3.9676E−01 | −5.4475E−01 | 1.0493E+01 | −5.2564E+01 |
| R2 | −2.9453E+01 | 4.9698E−01 | −5.0815E−01 | 6.0831E−02 | 1.7608E+01 | −1.3537E+02 |
| R3 | −9.7971E+00 | −2.0596E−02 | 2.3429E−01 | −5.5179E+00 | 5.2851E+01 | −2.9401E+02 |
| R4 | −6.1134E+00 | −2.2836E−01 | 1.6868E+00 | −9.2870E+00 | 3.2877E+01 | −7.8024E+01 |
| R5 | −1.1321E+01 | −1.5741E−01 | 1.6695E+00 | −9.0783E+00 | 3.0921E+01 | −7.0200E+01 |
| R6 | −4.1890E+02 | −3.5234E−01 | 5.0500E−02 | 1.2973E+00 | −5.7495E+00 | 1.3459E+01 |
| R7 | −2.1672E+01 | −4.5138E−02 | −1.7012E−03 | −3.4635E−02 | 1.2021E−01 | −1.8434E−01 |
| R8 | / | / | / | / | / | / |
| R9 | −2.9208E+02 | 7.2626E−01 | −1.5363E+00 | 1.8761E+00 | −1.6776E+00 | 1.1443E+00 |
| R10 | 3.1506E+00 | 8.9560E−01 | −1.9348E+00 | 2.1355E+00 | −1.4948E+00 | 6.9625E−01 |
| R11 | −1.7792E+00 | −1.2513E−01 | −1.8190E−03 | −1.8907E−01 | 4.0171E−01 | −3.5191E−01 |
| R12 | −5.3936E+00 | 1.6405E−01 | −5.1210E−01 | 6.2334E−01 | −4.5501E−01 | 2.1274E−01 |

| | Conic coefficient | Aspherical coefficient | | | |
|---|---|---|---|---|---|
| | k | A14 | A16 | A18 | A20 |
| R1 | 9.7813E+04 | 1.4856E+02 | −2.4464E+02 | 2.1719E+02 | −7.9803E+01 |
| R2 | −2.9453E+01 | 5.5888E+02 | −1.3304E+03 | 1.7094E+03 | −9.0339E+02 |
| R3 | −9.7971E+00 | 1.0110E+03 | −2.1055E+03 | 2.4294E+03 | −1.1831E+03 |
| R4 | −6.1134E+00 | 1.2147E+02 | −1.1769E+02 | 6.4030E+01 | −1.4968E+01 |
| R5 | −1.1321E+01 | 1.0452E+02 | −9.6366E+01 | 4.9534E+01 | −1.0818E+01 |
| R6 | −4.1890E+02 | −1.8758E+01 | 1.5438E+01 | −6.7570E+00 | 1.1906E+00 |
| R7 | −2.1672E+01 | 1.2236E−01 | 3.0927E−02 | −8.0750E−02 | 2.8278E−02 |
| R8 | / | / | / | / | / |
| R9 | −2.9208E+02 | −5.7553E−01 | 1.9597E−01 | −3.9535E−02 | 3.5286E−03 |
| R10 | 3.1506E+00 | −2.1863E−01 | 4.5162E−02 | −5.6075E−03 | 3.1834E−04 |
| R11 | −1.7792E+00 | 1.6473E−01 | −4.3022E−02 | 5.9006E−03 | −3.3035E−04 |
| R12 | −5.3936E+00 | −6.4714E−02 | 1.2485E−02 | −1.3911E−03 | 6.8007E−05 |

Tables 19 and 20 show design data of the inflexion points and arrest points of each of the lenses in the camera optical lens 50 according to the fifth embodiment of the present disclosure.

TABLE 19

| | Number of inflexion points | Inflexion point position 1 | Inflexion point position 2 | Inflexion point position 3 | Inflexion point position 4 | Inflexion point position 5 |
|---|---|---|---|---|---|---|
| P1R1 | 1 | 0.035 | | | | |
| P2R2 | 1 | 0.575 | | | | |
| P3R2 | 2 | 0.165 | 0.865 | | | |
| P4R1 | 1 | 0.515 | | | | |
| P5R1 | 1 | 0.705 | | | | |
| P5R2 | 2 | 0.735 | 1.695 | | | |
| P6R1 | 5 | 0.625 | 1.515 | 1.655 | 1.745 | 2.095 |
| P6R2 | 3 | 0.615 | 1.715 | 1.755 | | |

TABLE 20

| | Number of arrest points | Arrest point position 1 | Arrest point position 2 | Arrest point position 3 |
|---|---|---|---|---|
| P1R1 | 1 | 0.045 | | |
| P3R2 | 1 | 0.295 | | |
| P5R1 | 1 | 1.145 | | |
| P5R2 | 1 | 1.465 | | |
| P6R1 | 3 | 1.315 | 1.815 | 2.155 |
| P6R2 | 1 | 1.425 | | |

Figure 18:
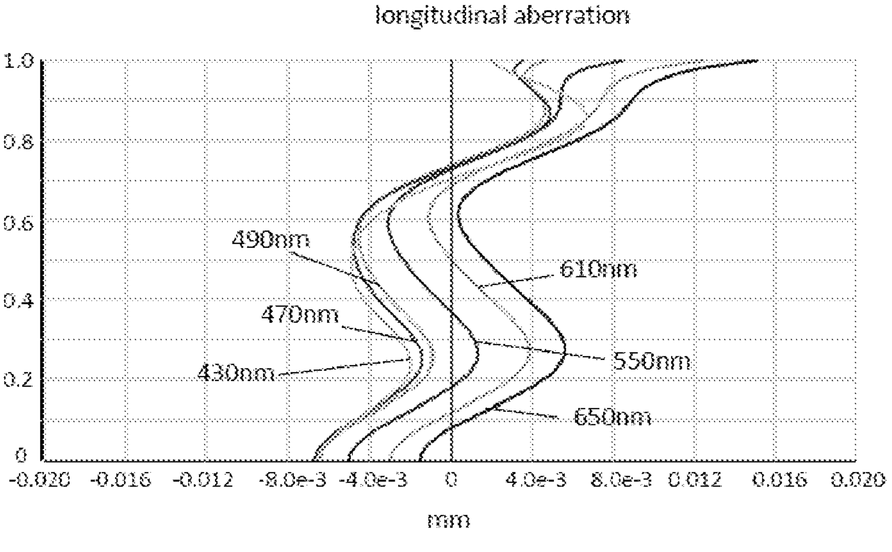
FIG. 18 is a schematic view of longitudinal aberration of the camera optical lens shown in FIG. 17.
Figure 19:
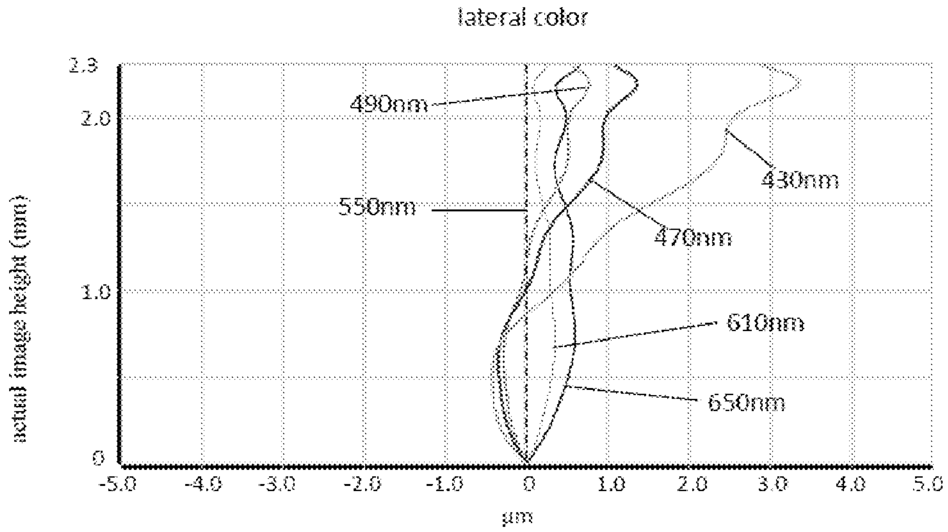
FIG. 19 is a schematic diagram of lateral color of the camera optical lens shown in FIG. 17.
Figure 20:
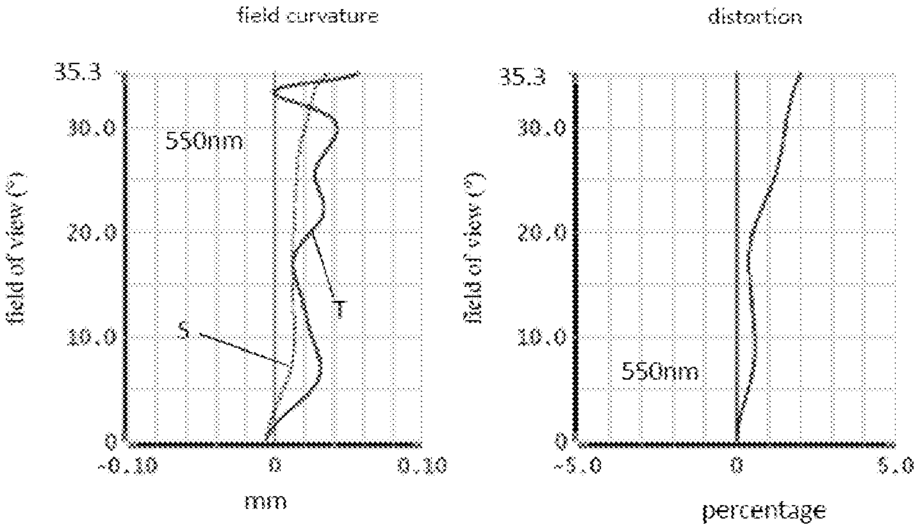
FIG. 20 is a schematic diagram of field curvature and distortion of the camera optical lens shown in FIG. 17.

FIGS. 18 and 19 show diagrams of longitudinal aberrations and lateral colors after light with a wavelength of 650 nm, 610 nm, 550 nm, 490 nm, 470 nm, and 430 nm passes the camera optical lens 50 of the fifth embodiment, respectively. FIG. 20 shows a schematic diagram of a field curvature and distortion after light with a wavelength of 550 nm passes the camera optical lens 50 of the fifth embodiment. The field curvature S in FIG. 20 is a field curvature in the sagittal direction, and T is a field curvature in the meridian direction.

In this embodiment, the entrance pupil diameter ENPD of the camera optical lens 50 is 1.268 mm, an image height IH of 1.0H is 2.300 mm, and the field of view FOV in the diagonal direction is 70.55°. The camera optical lens 50 meets the design requirements of large aperture, ultra-thin, wide-angle, and small head, and the on-axis and off-axis chromatic aberrations are fully corrected, thus having excellent optical characteristics.

Table 25, which appears later, shows the values corresponding to the parameters specified in the conditional formula for each of the values in the first, second, third, fourth and fifth embodiments.

Comparative Example

The meaning of symbols of the comparative example is the same as that of the first embodiment.

Figure 21:
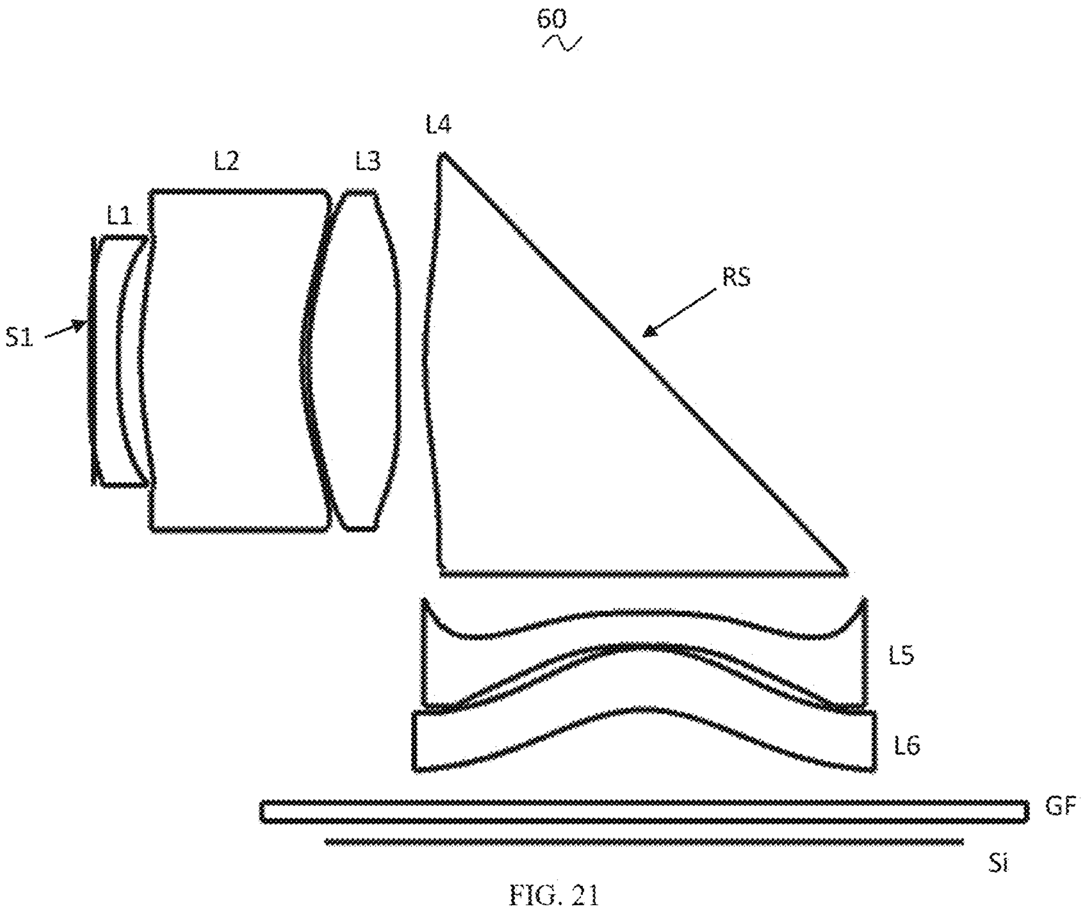
FIG. 21 is a schematic structural diagram of a camera optical lens according to a comparative example of the present disclosure.

FIG. 21 shows a camera optical lens 60 according to a comparative example.

Tables 21 and 22 show design data of the camera optical lens 60 of the comparative example.

TABLE 21

| | R | d | | nd | | vd | |
|---|---|---|---|---|---|---|---|
| S1 | ∞ | d0 = | −0.121 | | | | |
| R1 | −217.364 | d1 = | 0.175 | nd1 | 1.5444 | v1 | 55.81 |
| R2 | 3.497 | d2 = | 0.140 | | | | |
| R3 | 2.450 | d3 = | 0.996 | nd2 | 1.6610 | v2 | 20.53 |
| R4 | 1.379 | d4 = | 0.039 | | | | |
| R5 | 1.525 | d5 = | 0.553 | nd3 | 1.5444 | v3 | 55.81 |
| R6 | 6.663 | d6 = | 0.168 | | | | |
| R7 | 2.486 | d7 = | 2.623 | nd4 | 1.9000 | v4 | 40.00 |
| R8 | 0.000 | d8 = | 0.230 | | | | |
| R9 | 10.430 | d9 = | 0.196 | nd5 | 1.6499 | v5 | 21.26 |
| R10 | 3.796 | d10 = | 0.014 | | | | |
| R11 | 0.898 | d11 = | 0.369 | nd6 | 1.5444 | v6 | 55.81 |
| R12 | 0.861 | d12 = | 0.551 | | | | |
| R13 | ∞ | d13 = | 0.110 | ndg | 1.5200 | vg | 64.20 |
| R14 | ∞ | d14 = | 0.611 | | | | |

Table 22 shows aspherical data of each lens in the camera optical lens 60 of the comparative example.

TABLE 22

| | Conic coefficient | Aspherical coefficient | | | | |
|---|---|---|---|---|---|---|
| | k | A4 | A6 | A8 | A10 | A12 |
| R1 | 8.1946E+04 | 4.0325E−01 | −3.9884E−01 | −5.5442E−01 | 1.0522E+01 | −5.2638E+01 |
| R2 | −3.2984E+01 | 4.9138E−01 | −5.3246E−01 | −1.9756E−03 | 1.7495E+01 | −1.3549E+02 |
| R3 | −9.3342E+00 | −2.5662E−02 | 2.0890E−01 | −5.5278E+00 | 5.2877E+01 | −2.9399E+02 |
| R4 | −6.1149E+00 | −2.2405E−01 | 1.6918E+00 | −9.2832E+00 | 3.2879E+01 | −7.8026E+01 |
| R5 | −1.1935E+01 | −1.6148E−01 | 1.6758E+00 | −9.0702E+00 | 3.0926E+01 | −7.0195E+01 |
| R6 | −6.6148E+02 | −3.4932E−01 | 4.4820E−02 | 1.2951E+00 | −5.7424E+00 | 1.3469E+01 |
| R7 | −2.3174E+01 | −4.5904E−02 | −2.6658E−04 | −3.2510E−02 | 1.2077E−01 | −1.8501E−01 |
| R8 | / | / | / | / | / | / |
| R9 | −3.3925E+02 | 7.3015E−01 | −1.5359E+00 | 1.8759E+00 | −1.6776E+00 | 1.1443E+00 |
| R10 | 3.1768E+00 | 8.9653E−01 | −1.9348E+00 | 2.1355E+00 | −1.4948E+00 | 6.9626E−01 |
| R11 | −1.7739E+00 | −1.2366E−01 | −1.6027E−03 | −1.8905E−01 | 4.0170E−01 | −3.5192E−01 |

TABLE 22-continued

| | | | | | | |
|---|---|---|---|---|---|---|
| R12 | −5.4846E+00 | 1.6182E−01 | −5.1274E−01 | 6.2323E−01 | −4.5500E−01 | 2.1275E−01 |

| | Conic coefficient | Aspherical coefficient | | | |
|---|---|---|---|---|---|
| | k | A14 | A16 | A18 | A20 |
| R1 | 8.1946E+04 | 1.4851E+02 | −2.4460E+02 | 2.1755E+02 | −8.0134E+01 |
| R2 | −3.2984E+01 | 5.5860E+02 | −1.3287E+03 | 1.7105E+03 | −9.1704E+02 |
| R3 | −9.3342E+00 | 1.0108E+03 | −2.1064E+03 | 2.4283E+03 | −1.1832E+03 |
| R4 | −6.1149E+00 | 1.2147E+02 | −1.1770E+02 | 6.4031E+01 | −1.4932E+01 |
| R5 | −1.1935E+01 | 1.0452E+02 | −9.6366E+01 | 4.9524E+01 | −1.0821E+01 |
| R6 | −6.6148E+02 | −1.8751E+01 | 1.5440E+01 | −6.7583E+00 | 1.1874E+00 |
| R7 | −2.3174E+01 | 1.2136E−01 | 3.0177E−02 | −8.0923E−02 | 2.8676E−02 |
| R8 | / | / | / | / | / |
| R9 | −3.3925E+02 | −5.7552E−01 | 1.9597E−01 | −3.9534E−02 | 3.5280E−03 |
| R10 | 3.1768E+00 | −2.1863E−01 | 4.5163E−02 | −5.6075E−03 | 3.1833E−04 |
| R11 | −1.7739E+00 | 1.6473E−01 | −4.3022E−02 | 5.9007E−03 | −3.3033E−04 |
| R12 | −5.4846E+00 | −6.4715E−02 | 1.2485E−02 | −1.3912E−03 | 6.7979E−05 |

Tables 23 and 24 show design data of the inflexion points and arrest points of each of the lenses in the camera optical lens 60 according to the comparative example.

TABLE 23

| | Number of inflexion points | Inflexion point position 1 | Inflexion point position 2 | Inflexion point position 3 | Inflexion point position 4 |
|---|---|---|---|---|---|
| P1R1 | 1 | 0.035 | | | |
| P2R2 | 1 | 0.595 | | | |
| P3R2 | 2 | 0.155 | 0.845 | | |
| P4R1 | 1 | 0.515 | | | |
| P5R1 | 2 | 0.705 | 1.525 | | |
| P5R2 | 2 | 0.735 | 1.695 | | |
| P6R1 | 4 | 0.625 | 1.515 | 1.645 | 1.745 |
| P6R2 | 1 | 0.605 | | | |

TABLE 24

| | Number of arrest points | Arrest point position 1 | Arrest point position 2 |
|---|---|---|---|
| P1R1 | 1 | 0.055 | |
| P3R2 | 1 | 0.275 | |
| P4R1 | 1 | 1.055 | |
| P5R1 | 1 | 1.175 | |
| P5R2 | 2 | 1.485 | 1.765 |
| P6R1 | 1 | 1.335 | |
| P6R2 | 1 | 1.355 | |

Figure 22:
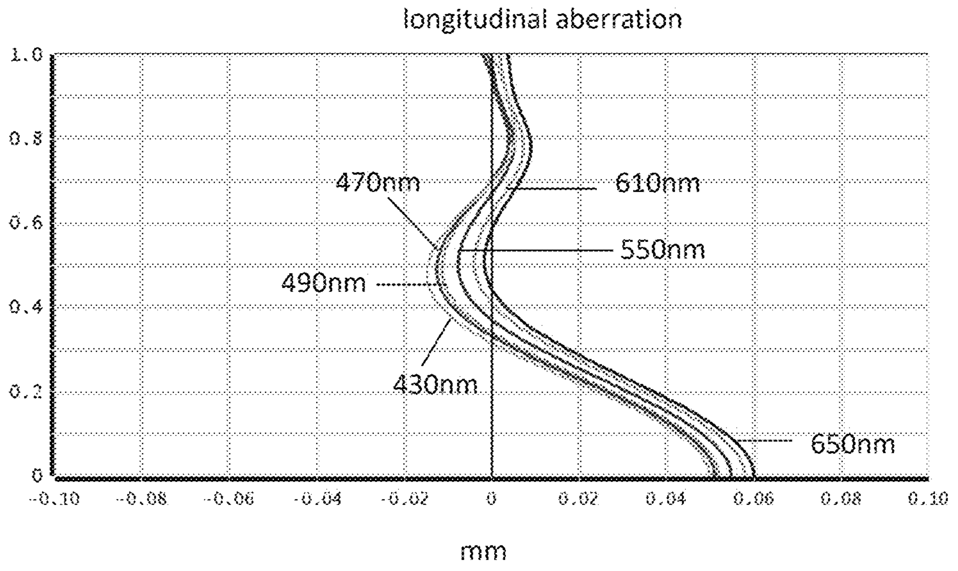
FIG. 22 is a schematic view of longitudinal aberration of the camera optical lens shown in FIG. 21.
Figure 23:
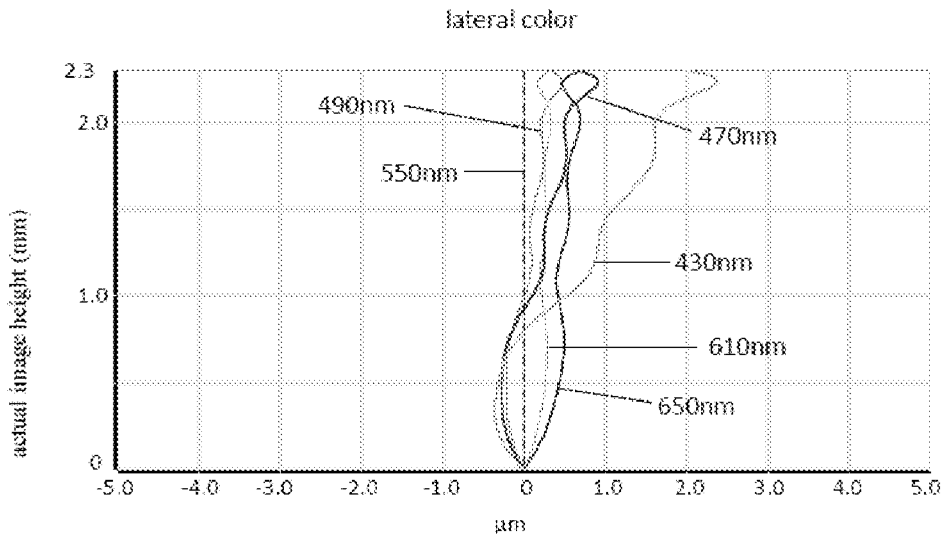
FIG. 23 is a schematic diagram of lateral color of the camera optical lens shown in FIG. 21.
Figure 24:
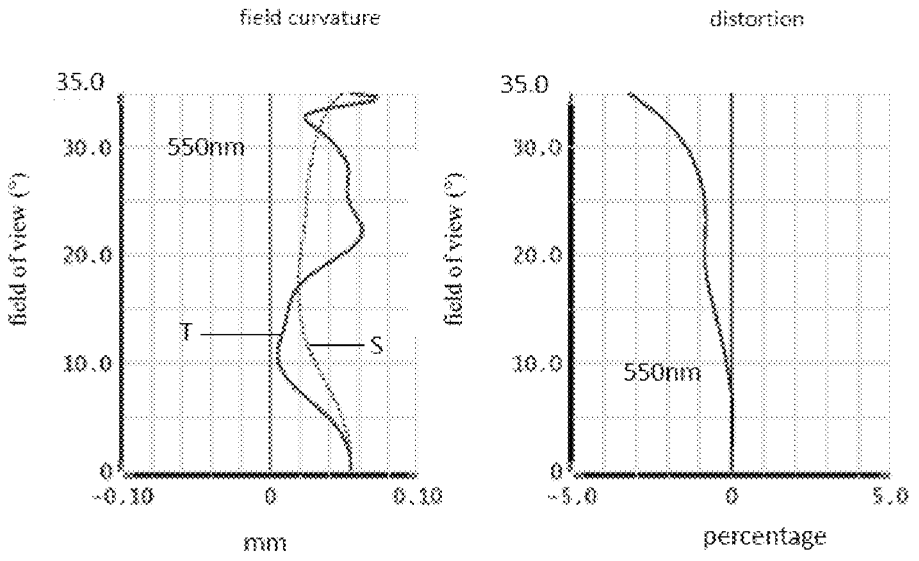
FIG. 24 is a schematic diagram of field curvature and distortion of the camera optical lens shown in FIG. 21.

FIGS. 22 and 23 show diagrams of longitudinal aberrations and lateral colors after light with a wavelength of 650 nm, 610 nm, 550 nm, 490 nm, 470 nm, and 430 nm passes the camera optical lens 60 of the comparative example, respectively. FIG. 24 shows a schematic diagram of a field curvature and distortion after light with a wavelength of 550 nm passes the camera optical lens 60 of the comparative example. The field curvature S in FIG. 24 is a field curvature in the sagittal direction, and T is a field curvature in the meridian direction.

Table 25 below lists the values of the corresponding conditional expressions in the comparative example according to the above conditional expressions. Obviously, the camera optical lens 60 of the comparative example does not satisfy the above-described conditional formula 95.00≤(FOV×f)/IH≤101.632.

In this embodiment, the entrance pupil diameter ENPD of the camera optical lens 60 is 1.372 mm, an image height IH of 1.0H is 2.300 mm, and the field of view FOV in the diagonal direction is 69.97°, such that the camera optical lens 60 does not meet the design requirements of large aperture, ultra-thin, wide-angle, and small head.

TABLE 25

| Parameter and conditional formula | Embodiment 1 | Embodiment 2 | Embodiment 3 | Embodiment 4 | Embodiment 5 | comparative example |
|---|---|---|---|---|---|---|
| f2/f3 | −2.202 | −3.977 | −1.947 | −1.208 | −2.331 | −2.159 |
| (FOV × f)/IH | 97.696 | 95.136 | 101.632 | 98.404 | 96.840 | 103.969 |
| f | 3.210 | 3.003 | 3.380 | 3.423 | 3.159 | 3.418 |
| f1 | −6.659 | −4.638 | −6.729 | −8.551 | −6.460 | −6.138 |
| f2 | −7.461 | −11.340 | −6.831 | −4.442 | −7.986 | −7.525 |
| f3 | 3.388 | 2.851 | 3.509 | 3.677 | 3.426 | 3.485 |
| f4 | 2.721 | 2.769 | 2.759 | 2.603 | 2.677 | 2.748 |
| f5 | −9.230 | −12.237 | −9.073 | −8.099 | −7.169 | −9.201 |
| f6 | 14.471 | 22.445 | 10.203 | 8.646 | 11.444 | 15.089 |
| FNO | 2.42 | 2.49 | 2.49 | 2.49 | 2.49 | 2.49 |
| TTL | 6.648 | 6.318 | 6.787 | 6.796 | 6.517 | 6.780 |
| IH | 2.300 | 2.300 | 2.300 | 2.300 | 2.300 | 2.300 |
| FOV | 70.00 | 72.85 | 69.16 | 66.13 | 70.55 | 69.97 |

Those of ordinary skill in the art will appreciate that the above embodiments are embodiments of the present disclosure, and that in practical application, various changes can be made to them in form and detail without departing from the spirit and scope of the present disclosure.

What is claimed is:

1. A camera optical lens, comprising six lenses, wherein the six lenses include: a first lens having a negative refractive power, a second lens having a negative refractive power, a third lens having a positive refractive power, a fourth lens having a positive refractive power, a fifth lens having a negative refractive power, and a sixth lens having a positive refractive power that are arranged in order from an object side to an image side of the camera optical lens;

wherein the fourth lens is embodied as a prism, wherein the camera optical lens satisfies following relationships:

$$-4.00 \leq f2/f3 \leq -1.20;$$

and $$95.00 \leq (FOV \times f)/IH \leq 101.632;$$

wherein f2 represents a focal length of the second lens, f3 represents a focal length of the third lens, FOV represents a field of view of the camera optical lens, f represents a focal length of the camera optical lens, and IH represents an image height of 1.0H of the camera optical lens.

2. The camera optical lens of claim 1, wherein the camera optical lens further satisfies a following relationship:

$$-2.50 \leq f1/f \leq -1.50;$$

wherein f1 represent a focal length of the first lens.

3. The camera optical lens of claim 1, wherein the camera optical lens further satisfies a following relationship:

$$v3 - v2 \geq 30.00;$$

wherein v2 represents an abbe number of the second lens, and v3 represents an abbe number of the third lens.

4. The camera optical lens of claim 1, wherein the camera optical lens further satisfies a following relationship:

$$2.00 \leq R9/R10 \leq 5.00;$$

wherein R9 represents a central curvature radius of an object-side surface of the fifth lens, and R10 represents a central curvature radius of an image-side surface of the fifth lens.

5. The camera optical lens of claim 1, wherein the camera optical lens further satisfies a following relationship:

$$20.00 \leq f6/d11 \leq 60.00;$$

wherein f6 represents a focal length of the sixth lens, and d11 represents an on-axis thickness of the sixth lens.

6. The camera optical lens of claim 1, wherein the camera optical lens further satisfies a following relationship:

$$SD11/IH \leq 0.31;$$

wherein SD11 represents a half-aperture of an object-side surface of the first lens.

7. The camera optical lens of claim 1, wherein the first lens has a concave image-side surface in a paraxial region, and the camera optical lens further satisfies following relationships:

$$0.49 \leq (R1 + R2)/(R1 - R2) \leq 1.59;$$

and $$0.01 \leq d1/TTL \leq 0.05;$$

wherein R1 represents a central curvature radius of an object-side surface of the first lens, R2 represents a central curvature radius of the image-side surface of the first lens, d1 represents an on-axis thickness of the first lens, and TTL represents a total track length of the camera optical lens.

8. The camera optical lens of claim 1, wherein the second lens has a convex object-side surface in a paraxial region and has a concave image-side surface in the paraxial region, wherein the camera optical lens further satisfies following relationships:

$$-7.55 \leq f2/f \leq -0.87;$$

$$1.30 \leq (R3 + R4)/(R3 - R4) \leq 6.59;$$

and $$0.06 \leq d3/TTL \leq 0.24;$$

wherein R3 represents a central curvature radius of the object-side surface of the second lens, R4 represents a central curvature radius of the image-side surface of the second lens, d3 represents an on-axis thickness of the second lens, and TTL represents a total track length of the camera optical lens.

9. The camera optical lens of claim 1, wherein the third lens has a convex object-side surface in a paraxial region, and has a concave image-side surface in the paraxial region, wherein the camera optical lens further satisfies following relationships:

$$0.48 \leq f3/f \leq 1.63;$$

$$-3.38 \leq (R5 + R6)/(R5 - R6) \leq -0.93;$$

and $$0.04 \leq d5/TTL \leq 0.14;$$

wherein R5 represents a central curvature radius of the object-side surface of the third lens, R6 represents a central curvature radius of the image-side surface of the third lens, d5 represents an on-axis thickness of the third lens, and TTL represents a total track length of the camera optical lens.

10. The camera optical lens of claim 1, wherein the fourth lens has a convex object-side surface in a paraxial region, and has a convex image-side surface in the paraxial region, wherein the camera optical lens further satisfies following relationships:

$$0.38 \leq f4/f \leq 1.38;$$

$$0.50 \leq (R7+R8)/(R7-R8) \leq 1.50;$$

and $$0.18 \leq d7/TTL \leq 0.61;$$

wherein f4 represents a focal length of the fourth lens, R7 represents a central curvature radius of the object-side surface of the fourth lens, R8 represents a central curvature radius of the image-side surface of the fourth lens, d7 represents an on-axis thickness of the fourth lens, and TTL represents a total track length of the camera optical lens.

* * * * *